(12) United States Patent
Yoshimura et al.

(10) Patent No.: US 8,428,386 B2
(45) Date of Patent: Apr. 23, 2013

(54) USING SEPARATE COEFFICIENTS TO WEIGHT AND ADD SEPARATE IMAGES TOGETHER FROM A SPATIAL FILTER PROCESS

(75) Inventors: Hideyoshi Yoshimura, Yamatokoriyama (JP); Kyosuke Taka, Nara (JP); Tomoe Matsuoka, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 1189 days.

(21) Appl. No.: 12/265,538

(22) Filed: Nov. 5, 2008

(65) Prior Publication Data

US 2009/0123085 A1   May 14, 2009

(30) Foreign Application Priority Data

Nov. 8, 2007  (JP) ................................. 2007-291116

(51) Int. Cl.
   *G06K 9/40*   (2006.01)
(52) U.S. Cl.
   USPC .......................................................... 382/266
(58) Field of Classification Search ................... 382/266
   See application file for complete search history.

(56) References Cited

U.S. PATENT DOCUMENTS

| | | | |
|---|---|---|---|
| 4,868,671 A | 9/1989 | Murakami | |
| 5,231,677 A | 7/1993 | Mita et al. | |
| 5,784,499 A | 7/1998 | Kuwahara et al. | |
| 5,818,964 A * | 10/1998 | Itoh | 382/205 |
| 6,178,268 B1 | 1/2001 | Furukawa et al. | |
| 6,226,050 B1 * | 5/2001 | Lee | 348/607 |
| 6,608,941 B1 | 8/2003 | Suzuki et al. | |
| 7,136,536 B2 * | 11/2006 | Andersson et al. | 382/261 |
| 7,174,032 B2 * | 2/2007 | Takiguchi et al. | 382/115 |
| 2004/0028265 A1 * | 2/2004 | Nishide | 382/131 |
| 2004/0208395 A1 * | 10/2004 | Nomura | 382/275 |
| 2007/0140574 A1 * | 6/2007 | Yamaguchi et al. | 382/233 |

FOREIGN PATENT DOCUMENTS

| | | |
|---|---|---|
| JP | 61-157169 A | 7/1986 |
| JP | 63-156475 A | 6/1988 |
| JP | 07-288768 A | 10/1995 |
| JP | 09-130628 A | 5/1997 |
| JP | 10-271340 A | 10/1998 |
| JP | 11-252373 A | 9/1999 |
| JP | 2000-253257 A | 9/2000 |
| JP | 3472479 B2 | 9/2003 |

* cited by examiner

*Primary Examiner* — David Zarka
(74) *Attorney, Agent, or Firm* — Birch, Stewart, Kolasch & Birch, LLP

(57) ABSTRACT

A local density calculation section calculates a density of a pixel region with a predetermined size including a current point of an input image disposed at the center on the basis of a pixel value of the pixel region. A mixing ratio calculation section generates a coefficient set of coefficients α and β in accordance with a local density value calculated by the local density calculation section, and outputs the generated coefficients α and β to a weight process section. The weight process section multiplies an operation result obtained from the input image by a first filter operation section by the coefficient α, multiplies an operation result obtained from the input image by a second filter operation section by the coefficient β, adds the multiplied results to each other and outputs the result of addition as a process result of a spatial filter process section.

15 Claims, 33 Drawing Sheets

FIG. 2
RELATED ART

| INPUT VALUE | R | G | B |
|---|---|---|---|
| FROM 100 TO 120 | 18 (3.6) | 20 (4.0) | 17 (3.4) |
| FROM 900 TO 920 | 2 (0.4) | 1 (0.2) | 2 (0.4) |

F I G. 7
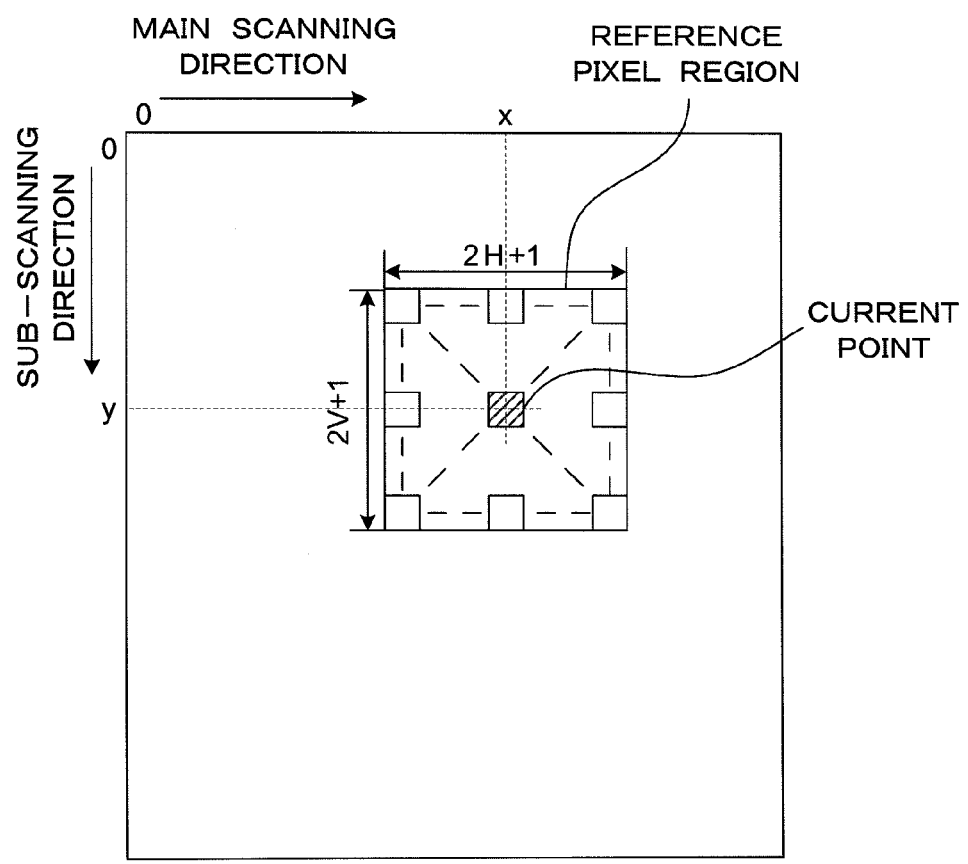

FIG. 9

| | 2H+1 = 7 | | | | | |
|---|---|---|---|---|---|---|
| 15 | 17 | 20 | 21 | 20 | 17 | 15 |
| 17 | 22 | 28 | 42 | 28 | 22 | 17 |
| 20 | 28 | 45 | 64 | 45 | 28 | 20 |
| 21 | 42 | 64 | 128 | 64 | 42 | 21 |
| 20 | 28 | 45 | 64 | 45 | 28 | 20 |
| 17 | 22 | 28 | 42 | 28 | 22 | 17 |
| 15 | 17 | 20 | 21 | 20 | 17 | 15 |

2V+1 = 7

F I G. 1 0

|  | 2H+1 = 7 | | | | | |
|---|---|---|---|---|---|---|
| -36 | -24 | -21 | -16 | -21 | -24 | -36 |
| -24 | -16 | 4 | 16 | 4 | -16 | -24 |
| -21 | 4 | 70 | 128 | 70 | 4 | -21 |
| -16 | 16 | 128 | 256 | 128 | 16 | -16 |
| -21 | 4 | 70 | 128 | 70 | 4 | -21 |
| -24 | -16 | 4 | 16 | 4 | -16 | -24 |
| -36 | -24 | -21 | -16 | -21 | -24 | -36 |

2V+1 = 7

F I G. 1 1
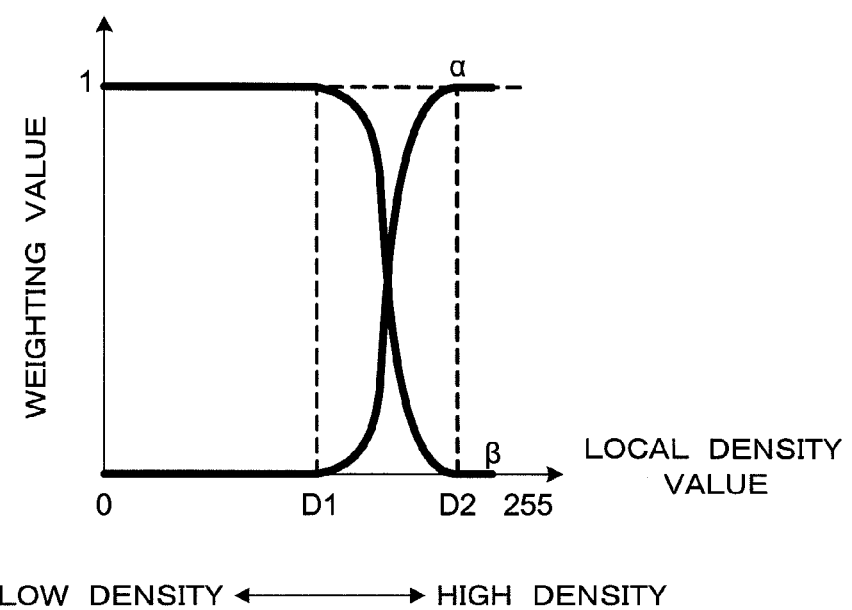

FIG. 16

| | 2H+1 = 7 | | | | | |
|---|---|---|---|---|---|---|
| -2 | 0 | 0 | 0 | 0 | 0 | -2 |
| 0 | -4 | -3 | 0 | -3 | -4 | 0 |
| 0 | -3 | -5 | -4 | -5 | -3 | 0 |
| 0 | 0 | -4 | 104 | -4 | 0 | 0 |
| 0 | -3 | -5 | -4 | -5 | -3 | 0 |
| 0 | -4 | -3 | 0 | -3 | -4 | 0 |
| -2 | 0 | 0 | 0 | 0 | 0 | -2 |

| SEGMENTATION CLASS SIGNAL | WEIGHTING COEFFICIENT | LOCAL DENSITY | | |
|---|---|---|---|---|
| | | LOW DENSITY | MEDIUM DENSITY | HIGH DENSITY |
| TEXT | α | 0 | 0 | 0 |
| | β | 1 | 1 | 1 |
| HALFTONE AND OTHERS | α | 0 | 1−a | 1 |
| | β | 1 | a | 0 |

F I G. 2 4
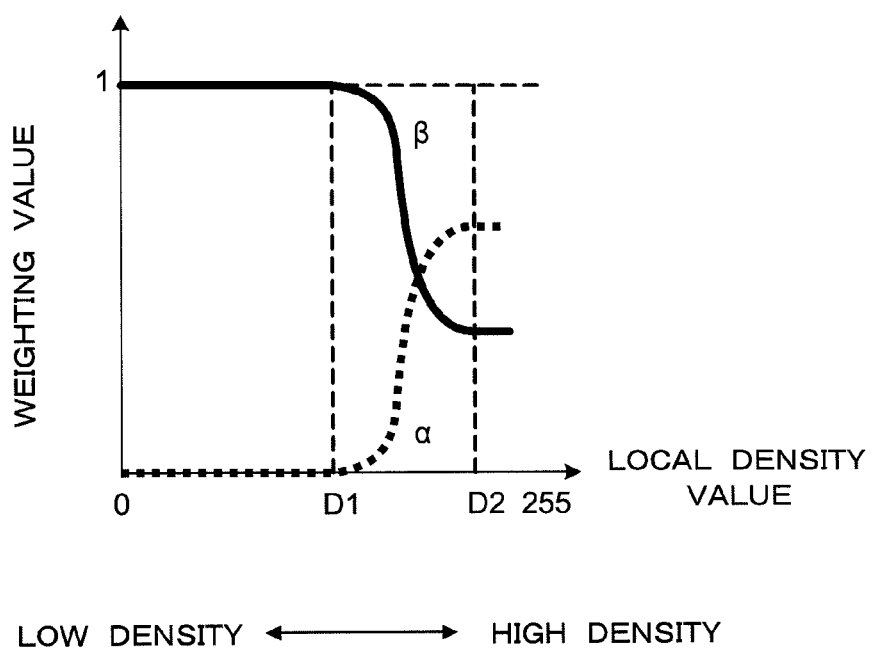

F I G. 2 5

|   | 2H+1 = 7 | | | | | |
|---|---|---|---|---|---|---|
| 0 | 1 | 1 | 1 | 1 | 1 | 0 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 0 | 1 | 1 | 1 | 1 | 1 | 0 |

2V+1 = 7

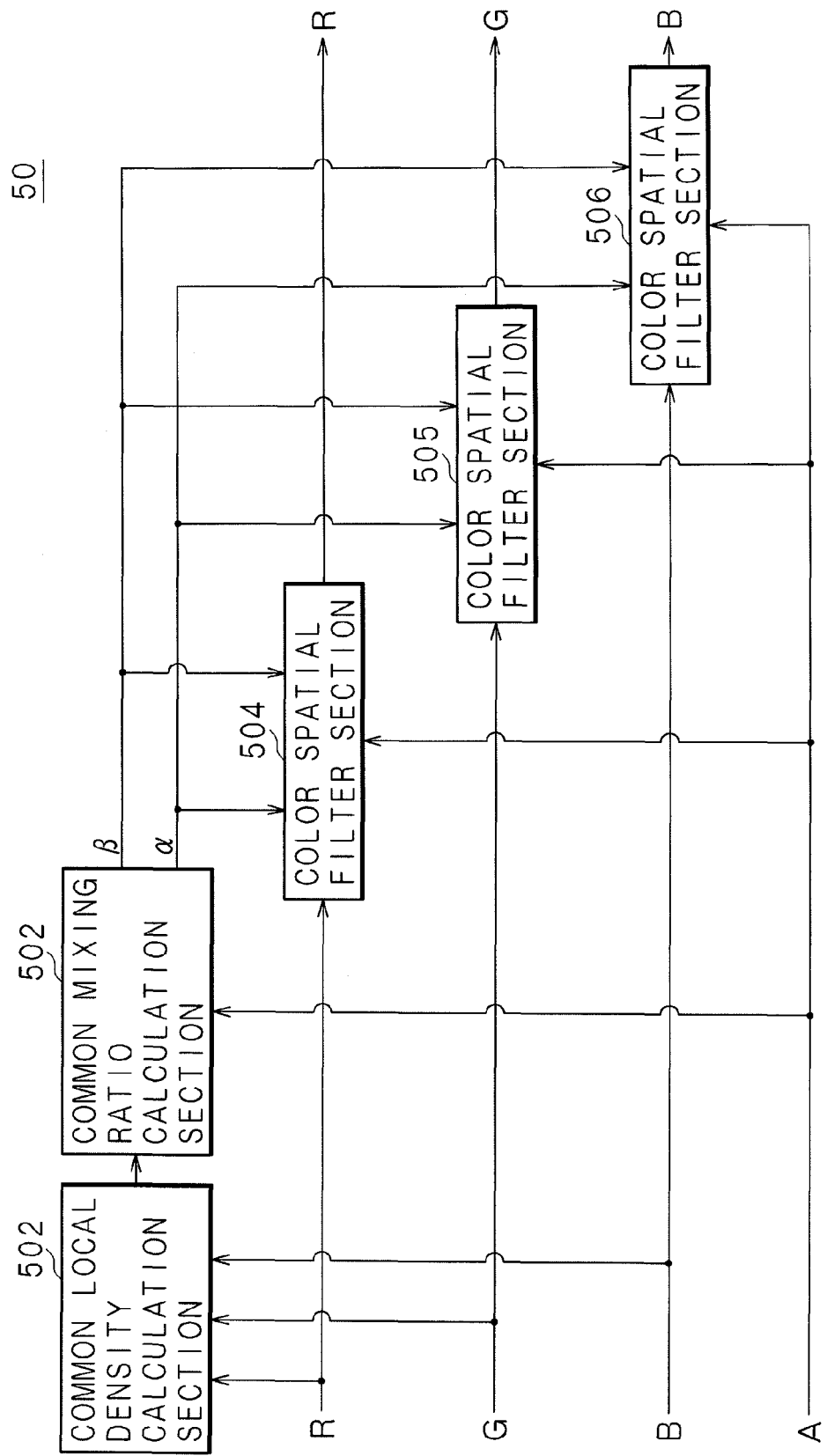

F I G. 30

|   | 2H+1 = 7 |   |   |   |   |   |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 1 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

2V+1 = 7

F I G. 3 1

|  | 2H+1 = 7 | | | | | | |
|---|---|---|---|---|---|---|---|
| 2V+1 = 7 | 0 | 0 | 0 | 0 | 0 | 0 | 0 |
| | 0 | 0 | 0 | 0 | 0 | 0 | 0 |
| | 0 | 0 | 1 | 2 | 1 | 0 | 0 |
| | 0 | 0 | 2 | 4 | 2 | 0 | 0 |
| | 0 | 0 | 1 | 2 | 1 | 0 | 0 |
| | 0 | 0 | 0 | 0 | 0 | 0 | 0 |
| | 0 | 0 | 0 | 0 | 0 | 0 | 0 |

F I G. 3 2

|   | 2H+1 = 7 | | | | | |
|---|---|---|---|---|---|---|
| 0 | 0 | 0 | 0 | 0 | 0 | 0 |
| 0 | 1 | 2 | 4 | 2 | 1 | 0 |
| 0 | 2 | 6 | 8 | 6 | 2 | 0 |
| 0 | 4 | 8 | 16 | 8 | 4 | 0 |
| 0 | 2 | 6 | 8 | 6 | 2 | 0 |
| 0 | 1 | 2 | 4 | 2 | 1 | 0 |
| 0 | 0 | 0 | 0 | 0 | 0 | 0 |

2V+1 = 7

USING SEPARATE COEFFICIENTS TO WEIGHT AND ADD SEPARATE IMAGES TOGETHER FROM A SPATIAL FILTER PROCESS

CROSS-REFERENCE TO RELATED APPLICATIONS

This Nonprovisional application claims priority under 35 U.S.C. §119(a) on Patent Application No. 2007-291116 filed in Japan on Nov. 8, 2007, the entire contents of which are hereby incorporated by reference.

BACKGROUND

1. Technical Field

The present invention relates to an image processing method and an image processing apparatus in which image quality degradation can be prevented by a filter process and an image forming apparatus including the image processing apparatus.

2. Description of Related Art

Between input of an image through an image input device such as a scanner or a digital camera and output of an image through an image output device such as a display or a printer, input image data is subjected to a combination of several image processes. As an image sensor of an optical input device such as a scanner or a digital camera, a CCD (Charge Coupled Device) image sensor, a CMOS (Complementary Metal Oxide Semiconductor) image sensor, a CIS (Contact Image Sensor) or the like is used. Furthermore, in a scanner or a digital camera, light collected through a lens is converted through photoelectric conversion by an image sensor into an electric signal, the resultant electric signal is subjected to A/D conversion for obtaining a sensed image as digital data, an image process is performed on the digital data for converting the data into a format according to an image output device, and the thus obtained image is outputted.

When, for example, a device designated as a multi-function printer or a digital copying machine including, as an image input device, a scanner using a linear line CCD sensor as an image sensor and including, as an image output device, an inkjet or laser printer is exemplified, several image processes are performed before a sensed image of a document read by the scanner is outputted to the printer as described in Japanese Patent No. 3472479. When an image process is performed by using an input sensed image, for example, a visual sensitivity correction process, a filter process and the like are performed in general.

The visual sensitivity correction process is performed for adjusting a digital data value of a sensed image in accordance with the visual characteristic of a person. The conversion characteristic of an image obtained through an image sensor and an A/D conversion process is generally a linear characteristic, and a digital data value is increased as the quantity of light entering an image sensor is increased. In contrast, the visual characteristic of a person is known to be logarithmic against the quantity of incident light. Therefore, the visual sensitivity correction process is performed in order to ease a subsequent image process by converting a digital data value obtained after the A/D conversion into a digital data value accordant with the visual characteristic of a person.

The filter process is performed for various purposes, and for example, it is performed for improving a degraded spatial frequency characteristic of a sensed image derived from the MTF (Modulation Transfer Function) characteristic of an optical lens used in an optical input device. In general, a digital data obtained after subjecting a sensed image to the visual sensitivity correction is used as an input image in the filter process. For example, Japanese Patent Application Laid-Open No. 61-157169 discloses a spatial filter process in which a result of an edge enhancement process and a result of a smoothing process obtained from an image are mixed on the basis of a result of edge discrimination. Alternatively, Japanese Patent Application Laid-Open No. 10-271340 discloses an image filter for mixing a result of a filter operation of an image with the original image in a mixing ratio calculated based on contrast. Furthermore, Japanese Patent Application Laid-Open No. 7-288768 discloses an image filter for switching the content of a smoothing process by using a difference in the pixel value between a current pixel and a surrounding pixel.

SUMMARY

Digital data of a sensed image outputted from an optical input device includes noise. The noise is partly derived from an image sensor and partly derived from an A/D conversion process. The noise derived from an image sensor is roughly divided into noise dependent on an output electric signal (that is, light quantity-dependent noise) and noise not dependent on the output electric signal (that is, light quantity-independent noise). Furthermore, the noise derived from the A/D conversion process minimally depends upon a digital output value.

The light quantity-dependent noise is caused due to variation in the number of electrons photoelectrically converted and is in proportion to the one-half power of light quantity. The light quantity-independent noise and the noise derived from the A/D conversion process are caused by random noise of an amplifier circuit, variation among image sensors or a conversion error of an A/D converter. Since there is a limit to means for reducing the random noise generally from the viewpoint of cost, random noise not dependent on a digital value is dominant in the total noise. As a result, digital data of a sensed image includes noise superposed to the same extent over the whole region of data values.

In the visual sensitivity correction process, a digital data value of a sensed image is subjected to non-linear conversion as described above. FIG. 1 is an explanatory diagram showing an exemplified relationship between an input value and an output value of the conventional visual sensitivity correction process. In FIG. 1, the abscissa indicates the input value and the ordinate indicates the output value. Digital data (an input value) of R (Red), G (Green) and B (Blue) each with a 10-bit value expressed by a value from 0 to 1023 is converted into an 8-bit value of R, G and B expressed by a value from 0 to 255 to be outputted. As shown in FIG. 1, in a region where the RGB digital data values are small, namely, in a high density region (dark portion), change of the output value against change of the input value is larger than in a region where the RGB digital data values are large, namely, in a low density region (bright portion).

FIG. 2 is an explanatory diagram showing change of an output value against an input value in the conventional visual sensitivity correction process. FIG. 2 shows the change of the output value obtained in the example shown in FIG. 1 and specifically shows the change of output values obtained when the input value is changed from 100 to 120, (namely, the change of the input value is 20) and when the input value is changed from 900 to 920 (namely, the change of the input value is 20). Each value in the brackets corresponds to an amplification factor (gain) against inclination of 0.25 (=256/1024) when the input value and the output value are assumed to be completely proportionally (linearly) changed. As shown in FIG. 2, although the input value is changed by 20 in either case, the output value is amplified in a range from 3.4 times to 4.0 times in case of the change from 100 to 120 corresponding to the high density region while the output value is attenuated in a range from 0.2 times to 0.4 times in case of the change from 900 to 920 corresponding to the low density region. As a result, noise is amplified in the high density region and is attenuated in the low density region in the output of this visual sensitivity correction process.

Accordingly, in the filter process performed after the visual sensitivity correction process, digital data including much noise in the high density region and inconspicuous noise in the low density region is inputted as an input image. Although the filter process with an enhancement characteristic is performed for improving the MTF characteristic, the noise having been amplified in the high density region is further amplified through the filter process with the enhancement characteristic.

FIG. 3 is an explanatory diagram showing exemplified image data obtained after and before the filter process with the enhancement characteristic. In FIG. 3, the abscissa indicates a pixel position and the ordinate indicates a data value (a density value) of the image data. FIG. 3 shows a result obtained after performing the filter process with the enhancement characteristic on input image data having transition from a low density portion (mainly corresponding to a page background area) to a high density portion (mainly corresponding to a solid area). As shown in FIG. 3, the input image data is minimally affected by the noise and has minimum variation in input values in the low density region but has large variation in input values due to the influence of noise in the high density region (the solid area). As a result of the filter process with the enhancement characteristic, the noise is further amplified in the high density region, and the variation in data values is disadvantageously increased through the filter process.

On the other hand, since digital data values obtained before and after the filter process are 8-bit integers of 0 through 255, a result of the filter process obtained to be smaller than 0 through the process is clipped to 0. Since a negative peak of the noise is thus limited, when an average value of digital data values obtained before the filter process and an average value of digital data values obtained after the filter process in a pixel position (pixel region) shown as C in FIG. 3 are calculated, the average value obtained before the filter process is 5.3 while the average value obtained after the filter process is 9.0. Thus, an average density is disadvantageously increased through the filter process.

The influence on image quality caused by the aforementioned disadvantage is particularly conspicuous in a high density region corresponding to a solid area where input values are constant, and specifically, the tone is varied in a high density region of an image so as to cause roughness therein. Furthermore, since the density value is increased through the filter process, the depth of the image is reduced (namely, the image becomes brighter) and the contrast is lowered. In order to avoid this problem, it is effective to perform a filter process with a smooth characteristic instead of the filter process with the enhancement characteristic. However, when the filter process with the smooth characteristic is performed, sharpness is spoiled particularly in an edge portion and the image quality is harmfully affected. Therefore, in the conventional technique for avoiding this problem, for the purpose of keeping an edge portion, an edge portion or a portion with a large contrast difference is detected, so as to suppress the smooth characteristic in the edge portion or the portion with a large contrast difference. When an edge is to be kept by thus using an edge portion or a contrast difference, however, although an edge can be kept with respect to a pole text, noise cannot be suppressed and the tone is varied in a high density region (principally in a solid area) having a density difference equivalent to the pale text. Thus, it has been impossible to overcome the aforementioned two problems.

The present invention has been devised under these circumstances, and an object of the invention is providing an image processing method and an image processing apparatus in which image quality degradation can be prevented by a filter process and an image forming apparatus including the image processing apparatus.

The image processing apparatus of this invention performing an image process on input image data, includes density calculation means for calculating a density of a pixel region including a plurality of pixels of an input image on the basis of a pixel value of the pixel region; first process means for performing a smoothing process on the input image data; second process means for performing a process different from the smoothing process by the first process means on the input image data; weighting coefficient setting means for setting, in accordance with the density calculated by the density calculation means, a first coefficient used for weighting image data having been processed by the first process means and a second coefficient used for weighting image data having been processed by the second process means; and weight process means for weighting the image data having been processed by the first process means by using the first coefficient set by the weighting coefficient setting means, weighting the image data having been processed by the second process means by using the second coefficient set by the weighting coefficient setting means, adding weighted image data to each other and outputting image data resulting from addition.

The image processing apparatus of this invention further includes area image discrimination means for determining, on the basis of a pixel value within a pixel block containing a plurality of pixels including a current pixel, whether or not the input image belongs to a text edge area, and the weighting coefficient setting means sets the first coefficient and the second coefficient for performing the smoothing process on the input image data when the area image discrimination means determines that the input image does not belong to a text edge area and the density calculated by the density calculation means is larger than a predetermined density threshold value.

Alternatively, the image processing apparatus of this invention further includes area image discrimination means for determining, on the basis of a pixel value within a pixel block containing a plurality of pixels including a current pixel, whether or not the input image belongs to a text edge area, and the weighting coefficient setting means sets the first coefficient and the second coefficient for performing the process of the second process means on the input image data when the area image discrimination means determines that the input image belongs to a text edge area.

In another aspect, the image processing apparatus of this invention performing a digital filter operation process on input image data, includes first storage means for storing a first filter coefficient used for performing a smoothing process on the input image data; second storage means for storing a second filter coefficient used for performing a process different from the smoothing process on the input image data; density calculation means for calculating a density of a pixel region including a plurality of pixels of an input image on the basis of a pixel value of the pixel region; weighting coefficient setting means for setting, in accordance with the density calculated by the density calculation means, a first coefficient used for weighting the first filter coefficient and a second coefficient used for weighting the second filter coefficient; operation means for performing a filter operation on the input image data by using at least the first filter coefficient or the second filter coefficient; and weight process means for weighting the first filter coefficient by using the first coefficient set by the weighting coefficient setting means, weighting the second filter coefficient by using the second coefficient set by the weighting coefficient setting means, obtaining a new filter coefficient by adding weighted filter coefficients to each other and outputting the new filter coefficient to the operation means.

The image processing apparatus of this invention further includes area image discrimination means for determining, on the basis of a pixel value within a pixel block containing a plurality of pixels including a current pixel, whether or not the input image belongs to a text edge area, and the weighting coefficient setting means sets the first coefficient and the second coefficient for performing the filter operation on the input image by the operation means by using the first filter coefficient when the area image discrimination means determines that the input image does not belong to a text edge area and the density calculated by the density calculation means is larger than a predetermined density threshold value.

Alternatively, the image processing apparatus of this invention further includes area image discrimination means for determining, on the basis of a pixel value within a pixel block containing a plurality of pixels including a current pixel, whether or not the input image belongs to a text edge area, and the weighting coefficient setting means sets the first coefficient and the second coefficient for performing the filter operation on the input image by the operation means by using the second filter coefficient when the area image discrimination means determines that the input image belongs to a text edge area.

In the image processing apparatus of this invention, the density calculation means calculates the density on the basis of the pixel value of the pixel region of each of a plurality of specific colors, and the weighting coefficient setting means sets the first coefficient and the second coefficient for performing an identical weight process with respect to the respective specific colors in accordance with the density calculated by the density calculation means.

The image forming apparatus of this invention includes any of the aforementioned image processing apparatus; and an image forming means for forming an image having been processed by the image processing apparatus.

The computer program of this invention is a control program for realizing any of the aforementioned image processing apparatuses by a computer.

The computer program is recorded in the computer-readable memory product of this invention.

According to the present invention, the density of a pixel region including a plurality of pixels of an input image is calculated on the basis of a pixel value of the pixel region. The pixel region is, for example, a region including a current point disposed at the center and has a size of 5 pixels by 5 pixels. The density to be calculated is, for example, an average value of density values of the pixels. Image data obtained by subjecting input image data to the smoothing process and image data obtained by subjecting the input image data to the process different from the smoothing process are respectively weighted in accordance with the density of the pixel region, and the thus obtained weighted image data are added to each other. Assuming that, for example, a weighting coefficient $\alpha$ is used for the image data resulting from the smoothing process and that a weighting coefficient $\beta$ is used for the image data resulting from the process different from the smoothing process, when the density of the pixel region is high (namely, the pixel region is a dark portion), the weighting coefficients $\alpha$ and $\beta$ are respectively set to 1 and 0. When the density of the pixel region is low (namely, the pixel region is a bright portion), the weighting coefficients $\alpha$ and $\beta$ are respectively set to 0 and 1. As the density of the pixel region is varied from a low density to a high density, the weighting coefficient $\alpha$ is increased from 0 to 1 and the weighting coefficient $\beta$ is reduced from 1 to 0. When the weighting coefficients (mixing ratios) $\alpha$ and $\beta$ are thus continuously changed as the density of the pixel region is varied from a low density side to a high density side, even if the density of an input image is changed, abrupt change in the density of an output image can be suppressed, and image quality degradation can be prevented.

Furthermore, according to the present invention, when an input image is determined not to belong to a text edge area on the basis of a pixel value of a pixel block containing a plurality of pixels including a current pixel and the pixel region is a high density region (i.e., the calculated density is higher than a predetermined density threshold value), input image data (for example, image data of a solid are or the like) is subjected to the smoothing process. In this manner, noise is suppressed in the high density region and increase of an average density caused through a filter process due to the noise can be suppressed, and hence, the image quality degradation can be prevented. Moreover, since a text edge area is eliminated in performing the smoothing process, while preventing the degradation of a text edge, noise amplified in a high density region can be suppressed through the smoothing process, resulting in preventing the image quality degradation.

Alternatively, according to the present invention, when an input image is determined to belong to a text edge area on the basis of a pixel value of a pixel block containing a plurality of pixels including a current pixel or when the pixel region is a low density region, input image data is subjected to the process different from the smoothing process. In this case, the process different from the smoothing process may be, for example, an enhancement process, a mixed process of an enhancement process and a smoothing process, or a combination of a strong smoothing process and a weak smoothing process. In this manner, in a text edge area or a low density region other than a text edge area (such as a bright portion like a background area), degradation of an edge can be prevented by keeping the edge.

Furthermore, according to the present invention, the density of a pixel region including a plurality of pixels of an input image is calculated on the basis of a pixel value of the pixel region. The pixel region is, for example, a region including a current point disposed at the center and has a size of 5 pixels by 5 pixels. The density to be calculated is, for example, an average value of density values of the pixels. A first filter coefficient and a second filter coefficient are respectively subjected to a weight process in accordance with the density of the pixel region, and input image data is subjected to the filter operation by using a filter coefficient obtained by adding the weighted filter coefficients to each other. Assuming that, for example, a weighting coefficient $\alpha$ is used for the first filter coefficient and that a weighting coefficient $\beta$ is used for the second filter coefficient, when the density of the pixel region is high (namely, the pixel region is a dark portion), the weighting coefficients $\alpha$ and $\beta$ are respectively set to 1 and 0. When the density of the pixel region is low (namely, the pixel region is a bright portion), the weighting coefficients $\alpha$ and $\beta$ are respectively set to 0 and 1. As the density of the pixel region is varied from a low density to a high density, the weighting coefficient α is increased from 0 to 1 and the weighting coefficient β is reduced from 1 to 0. When the weighting coefficients (mixing ratios) α and β are thus continuously changed as the density of the pixel region is varied from a low density side to a high density side, even if the density of an input image is changed, abrupt change in the density of an output image can be suppressed, and image quality degradation can be prevented.

Furthermore, according to the present invention, when an input image is determined not to belong to a text edge area on the basis of a pixel value of a pixel block containing a plurality of pixels including a current pixel and the pixel region is a high density region (i.e., the calculated density is higher than a predetermined density threshold value), the operation means performs a filter operation on the input image data by using the first filter coefficient for the smoothing process. In this manner, noise is suppressed in the high density region and increase of an average density caused through the filter process due to the noise can be suppressed, and hence, the image quality degradation can be prevented. Moreover, since a text edge area is eliminated in performing the smoothing process, while preventing the degradation of a text edge, noise amplified in a high density region can be suppressed through the smoothing process, resulting in preventing the image quality degradation.

Alternatively, according to the present invention, when an input image is determined to belong to a text edge area on the basis of a pixel value of a pixel block containing a plurality of pixels including a current pixel or when the pixel region is a low density region, the operation means performs the filter operation on the input image data by using the second filter coefficient different from the first filter coefficient for the smoothing process. In this case, the filter operation performed by using the second filter coefficient may be, for example) an enhancement process operation and a process operation of an enhancement process operation and a smoothing process operation, or a combination of a strong smoothing process operation and a weak smoothing process operation. In this manner, in a text edge area or a low density region other than a text edge area (such as a bright portion like a background area), degradation of an edge can be prevented by keeping the edge. Moreover, since the operation means is commonly used and a filter coefficient to be used in the filter operation is selected in accordance with the density of a pixel region, the complexity can be reduced, for example, as compared with a case where a plurality of operation means are provided in accordance with the density of a pixel region so as to perform respective operations. In particular, when the size of a filter (the size of filter matrix) is large, the throughput can be further reduced. Furthermore, when the number of kinds of filter coefficient values is small, the throughput can be optimized.

In addition, according to the present invention, the density of a pixel region is determined on the basis of a pixel value of the pixel region of each of a plurality of specific colors of R (red), G (green) and B (blue), and a common weight process is performed with respect to the specific colors in accordance with the determined density. For example, each of the weighting coefficients (mixing ratios) α and β has the same value with respect to all the specific colors. Since the common weighting coefficients are used, a common filter process or filter operation can be performed with respect to all the colors, and hence, non-uniformity in the process or operation between color mixture and a single color can be prevented.

Moreover, according to the present invention, an image having been processed by the aforementioned image processing apparatus is formed, the image can be formed while preventing the image quality degradation.

As described so far, according to the present invention, noise can be suppressed in a high density region and the increase of an average density caused through a filter process by the noise can be suppressed, resulting in preventing the image quality degradation. Furthermore, in an image belonging to a text edge area, the degradation of an edge can be prevented.

The above and further objects and features of the invention will more fully be apparent from the following detailed description with accompanying drawings.

BRIEF DESCRIPTION OF THE SEVERAL VIEW OF THE DRAWINGS

FIG. 2 is an explanatory diagram showing change of an output value against an input value in the conventional visual sensitivity correction process;

FIG. 7 is an explanatory diagram showing an example of a reference pixel region used for a filter operation;

FIG. 9 is an explanatory diagram showing an example of filter coefficients used in a first filter operation section;

FIG. 10 is an explanatory diagram showing an example of filter coefficients used in a second filter operation section;

FIG. 11 is an explanatory diagram showing an example of weighting coefficients;

FIG. 16 is an explanatory diagram showing an example of filter coefficients with an enhancement characteristic;

FIG. 17 is an explanatory diagram showing an example of setting of weighting coefficients;

FIG. 24 is an explanatory diagram showing another example of the weighting coefficients;

FIG. 25 is an explanatory diagram showing an example of filter coefficients with a smooth characteristic;

FIG. 26 is a block diagram showing an example of the configuration of a spatial filter process section of Embodiment 6;

FIG. 30 is an explanatory diagram showing an example of a first filter coefficient set;

FIG. 31 is an explanatory diagram showing an example of a second filter coefficient set;

FIG. 32 is an explanatory diagram showing an example of a third filter coefficient set.

DETAILED DESCRIPTION

The present invention will now be described with reference to the accompanying drawings showing preferred embodiments.

Embodiment 1

Figure 4:
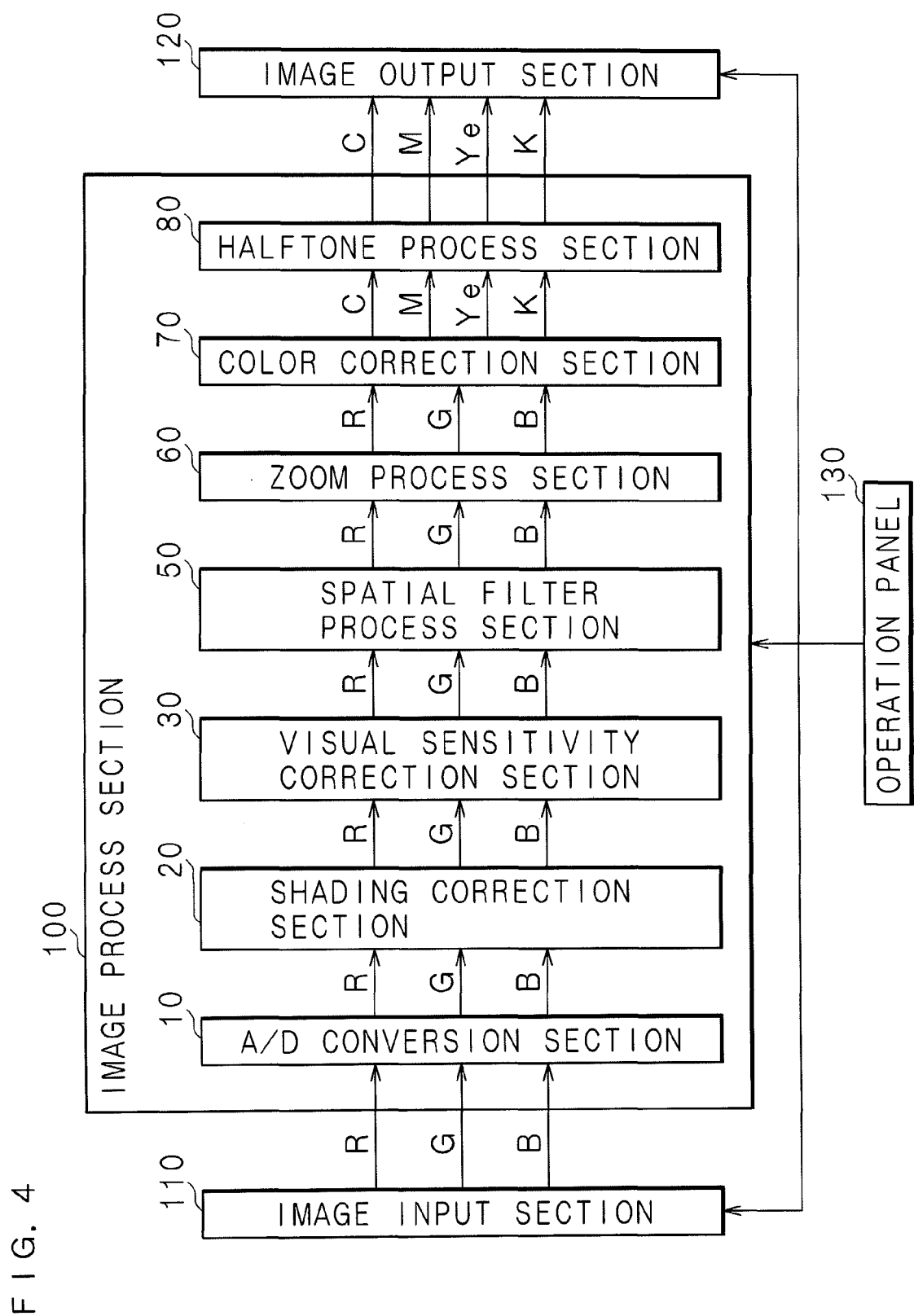
FIG. 4 is a block diagram showing the configuration of an image forming apparatus including an image processing apparatus according to the invention.

FIG. 4 is a block diagram showing the configuration of an image forming apparatus including an image processing apparatus according to this invention. The image forming apparatus (such as a digital color copying machine) includes an image process section 100 corresponding to the image processing apparatus, an image input section 110, an image output section 120, an operation panel 130 and the like.

The image input section 110 includes a light source for irradiating a document with light for reading, a CCD line sensor, etc. (all not shown), and converts light reflected from the document into electric signals separated in colors of R (red), G (green) and B (blue) for obtaining color image signals (RGB reflectance signals). Since the line sensor is used as an image sensor, the light source and the CCD line sensor are scanned along a lengthwise direction (a main scanning direction) and a widthwise direction (a sub-scanning direction) of the line sensor, so as to read a two-dimensional image. The thus generated electric signals are subjected to an A/D conversion process to be converted into digital data, which is outputted to the following image process section 100 as image data.

The image process section 100 executes respective processes described below on the input image data, and outputs an output image to the image output section 120. The image output section 120 includes an electrophotographic printing section, an inkjet printing section or the like, so that the printing section can form an image on a sheet such as paper or an OHP film and output the formed image. The operation panel 130 includes setting buttons for setting an operation mode of the digital copying machine, a ten-key pad and a display device such as a liquid crystal display.

The image process section 100 includes an A/D conversion section 10, a shading correction section 20, a visual sensitivity correction section 30, a spatial filter process section 50, a zoom process section 60, a color correction section 70, a halftone process section 80 and the like.

Figure 1:
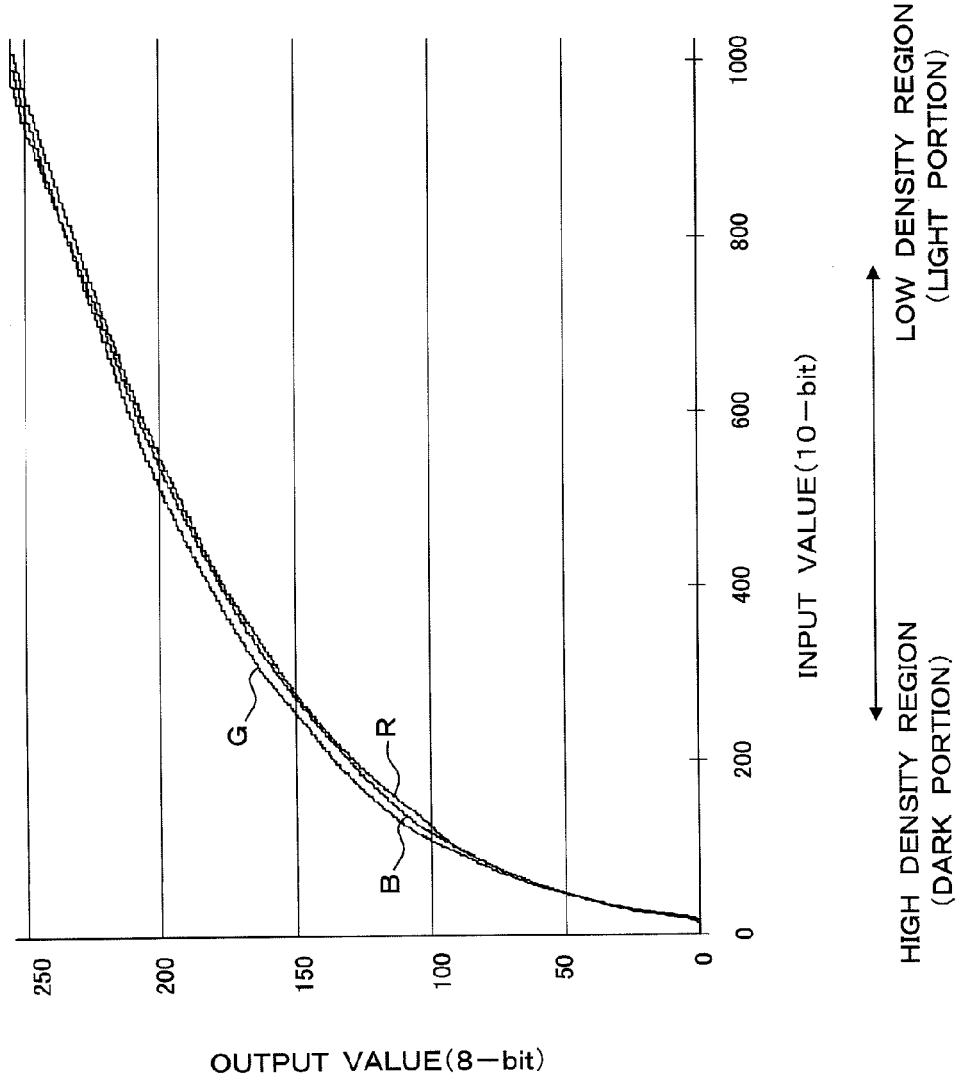
FIG. 1 is an explanatory diagram showing an example of the relationship between an input value and an output value in a conventional visual sensitivity correction process.
Figure 3:
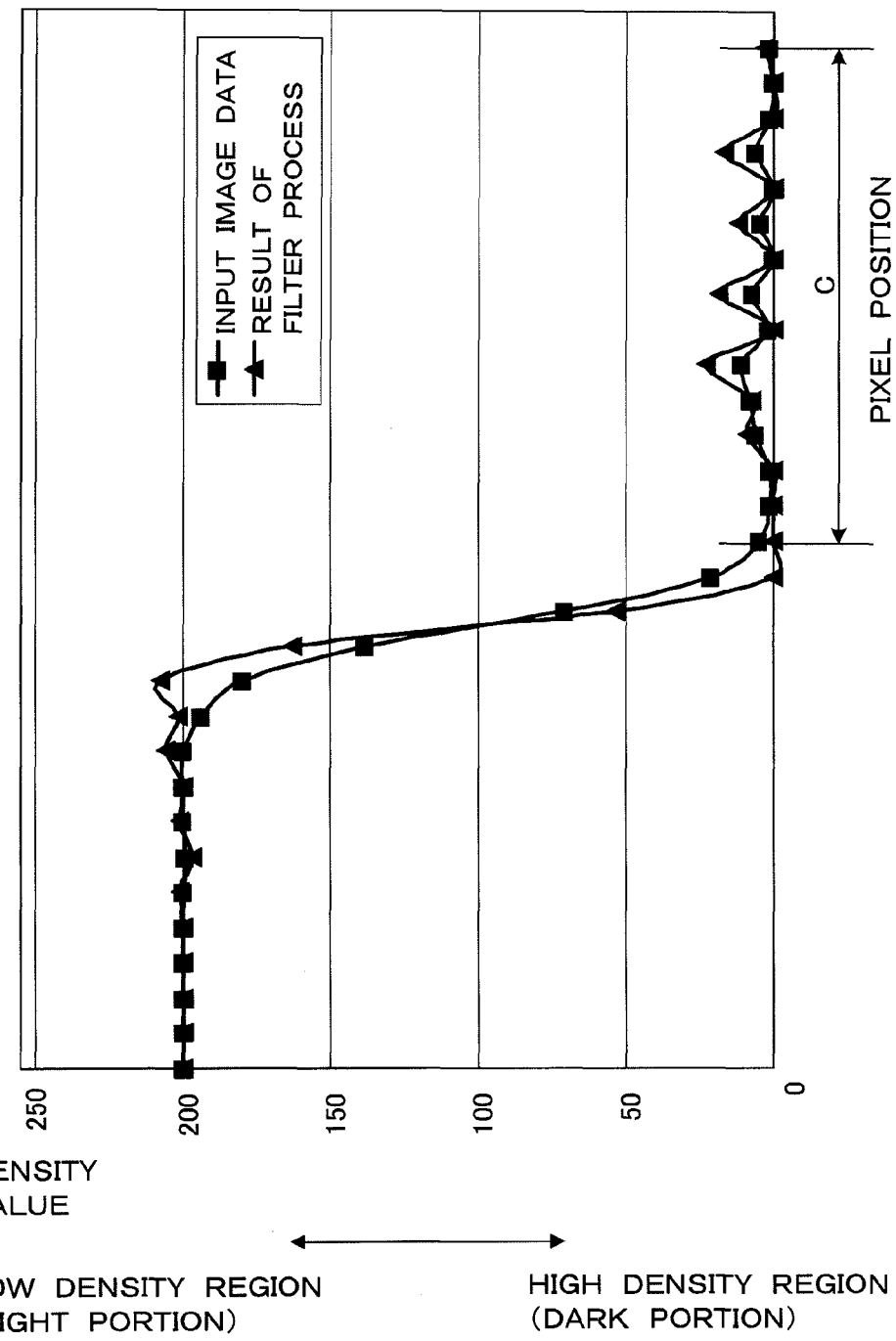
FIG. 3 is an explanatory diagram showing an example of image data obtained before and after a filter process with an enhancement characteristic.

The shading correction section 20 performs a shading correction process on a reflectance signal obtained through the A/D conversion by the A/D conversion section 10. The shading correction process is performed in order to remove various kinds of distortions generated in an image signal due to the structures of a lighting system, an image focusing system and an image sensing system of the image input section 110. The visual sensitivity correction section 30 performs, in order to correct a difference between the sensitivity characteristic of the CCD line sensor used as the image sensor and the visual sensitivity characteristic of a person, a process for reading a data corresponding to an input data of an LUT (Look Up Table) memory provided correspondingly to each of R, G and B signals and outputting the read data as an output data The LUT memory stores, for example, data having a conversion characteristic as shown in FIG. 1.

The spatial filter process section 50 performs a spatial filter process on the input image data, which will be described in detail later.

In order to eliminate a difference in resolution between the image input section 110 and the image output section 120, the zoom process section 60 changes, in accordance with the image output section 120, the resolution and the size of an image of the image data having been inputted with the resolution and the image size dependent on the image input section 110. The color correction section 70 converts the R, G and B signals into C (cyan), M (magenta), Ye (yellow) and K (black) density signals and performs a color correction process on the C, M, Ye and K density signals for attaining a faithful color reproduction in the image output section 120. Specifically, in the color correction process, color impurity based on a spectral characteristic of each of C, M, Ye and K color materials respectively including useless elimination components is removed from each of the C, M, Ye and K density signals.

The halftone process section 80 performs a gray scale correction process and a halftone generation process on the C, M, Ye and K image data. In the halftone generation process, an image is divided into a plurality of pixels for reproducing gray scales, and a binarization or multi-level dither method or an error diffusion method can be employed. Also, the halftone process section 80 can perform a process for converting a density value of image data into a halftone area rate, that is, a characteristic value of the image output section 120. A density signal having been processed by the halftone process section 80 is outputted to the image output section 120.

The operation of the image process section 100 is controlled by, for example, a CPU (Central Processing Unit) not shown. It is noted that the image forming apparatus is not limited to a digital copying machine but may be, for example, a digital color multi-function peripheral having a copying function, a printer function, a facsimile transmitting function, a scan to e-mail function and the like. The digital color multi-function peripheral further includes a communication device containing, for example, a modem or a network card. In transmitting a facsimile, a transmission procedure to a destination is proceeded by the modem, and when a transmittable state is attained, image data compressed in a predetermined format (image data read through a scanner) is read from a memory and subjected to a necessary process such as conversion of the compression format, and the resultant data is successively transmitted through a communication line to the destination. Alternatively, in receiving a facsimile, the CPU receives image data sent from an originating communication device while proceeding a communication procedure and inputs the received data to the image process section 100, and the image process section 100 performs a decompress process on the received image data by a compression/decompression process section (not shown). The decompressed image data is subjected to a rotation process or a resolution conversion process if necessary and is outputted to the image output section 120 after an output tone correction process, a halftone process and the like. Furthermore, it is possible to execute data communication through a network card or a LAN cable with a computer or another digital multi-function peripheral connected to a network. The image forming apparatus is not limited to a color multi-function peripheral but may be a monochrome multi-function peripheral.

Figure 5:
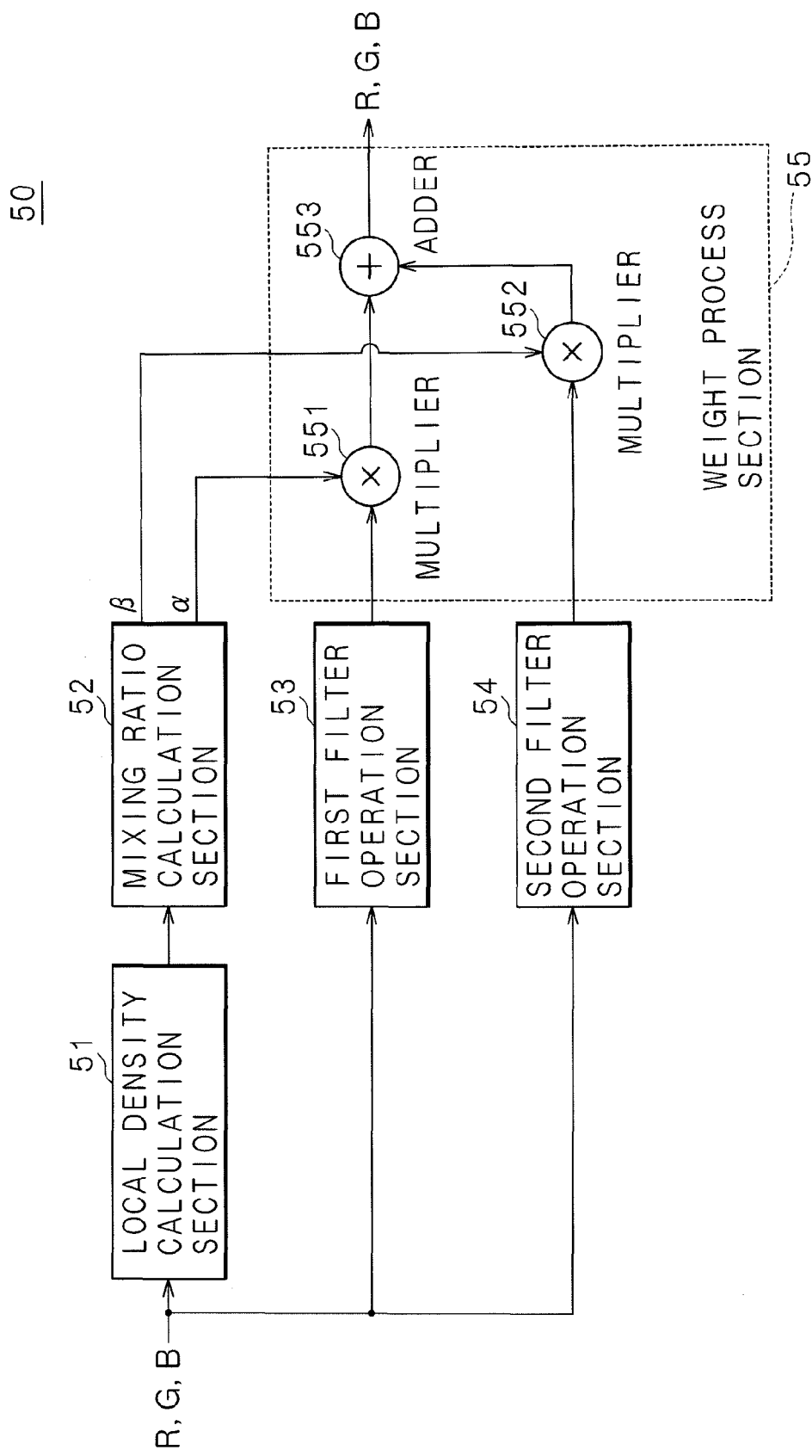
FIG. 5 is a block diagram showing an example of the configuration of a spatial filter process section.

FIG. 5 is a block diagram showing an example of the configuration of the spatial filter process section 50. The spatial filter process section 50 includes a local density calculation section 51, a mixing ratio calculation section 52, a first filter operation section 53, a second filter operation section 54, a weight process section 55 and the like, and the weight process section 55 includes multipliers 551 and 552 and an adder 553.

The spatial filter process section 50 receives, as input image data, image data including R, G and B data of 8 bits each as data for one pixel, and outputs image data including the R, G and B data of 8 bits each after performing a prescribed filter process operation. The spatial filter process section 50 performs the filter process operation independently on signals of the respective colors of R, G and B, and does not refer to data of another color in the operation for each color. Now, the contents of the operation for a single plain color (of R, G or B) will be described. The contents of the operation for each of the other colors are substantially the same. On the basis of a pixel value within a pixel region of an input image with a predetermined size including a current point (a current pixel) disposed at the center, the local density calculation section 51 calculates a density of the pixel region.

Figure 6:
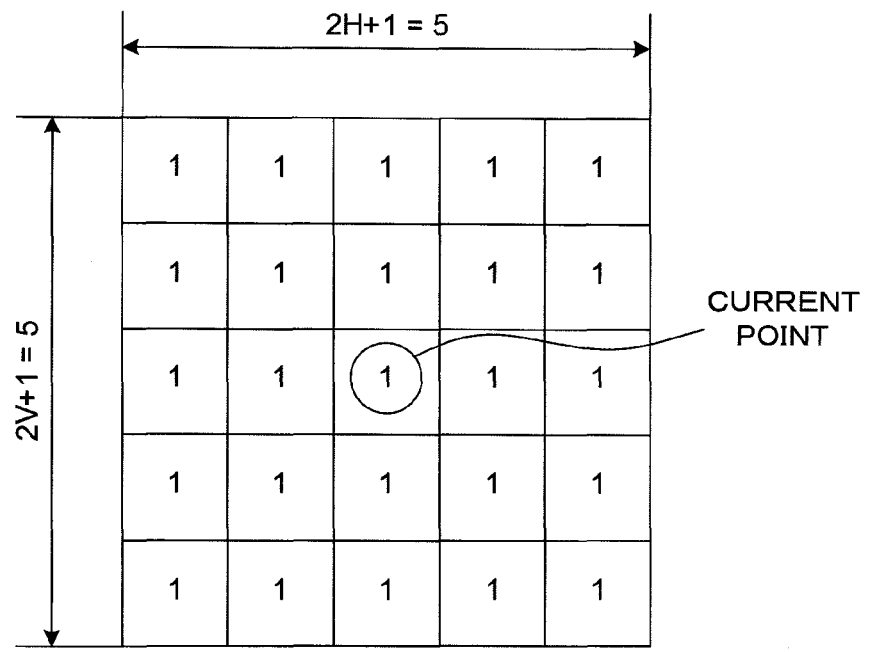
FIG. 6 is an explanatory diagram showing an example of local density calculation for a pixel region.

FIG. 6 is an explanatory diagram showing an example of the local density calculation for a pixel region. As shown in FIG. 6, the pixel region includes (2H+1) pixels arranged along the main scanning direction of an input image, namely, along the pixel column direction of the CCD line sensor, and (2V+1) pixels arranged along the sub-scanning direction of the image, namely, along the scanning direction of the CCD line sensor, and has a size of, for example, (2H+1)=5 pixels by (2V+1)=5 pixels.

The local density calculation section 51 multiplies each pixel value of the 25 pixels including the current point by 1 and divides the multiplied result by the size of the pixel region (namely, 25 pixels). Thus, the local density calculation section 51 calculates an average density of the pixel region. In the case where the pixel values of the input image are 0 through 255 (8 bits), the local density calculation section 51 calculates a value obtained by subtracting the calculated average density value from 255 as an ultimate local density value (density) of the pixel region.

Since the spatial filter process section uses RGB signals in the operation, as a density value is closer to 0, the density is higher, and as a density value is closer to 255, the density is lower. Since a local density value is obtained by subtracting a calculated density value from 255, as a local density value is closer to 0, the density is lower (i.e., the image is brighter), and as a local density value is closer to 255, the density is higher (i.e., the image is darker).

When CMY signals or CMYK signals are used as the image data, as a density value is closer to 0, the density is lower, and as a density value is closer to 255, the density is higher Since a local density value is obtained by subtracting a calculated density value from 255, as a local density value is closer to 255, the density is lower (i.e., the image is brighter), and as a local density value is closer to 0, the density is higher (i.e., the image is darker).

The calculation of a local density value is not limited to the calculation based on an average density of a pixel region, but a density representing a current point (a current pixel) is obtained as a local density with the influence of noise included in an input image suppressed. For example, a density average value of a plurality of pixels having a median density (or a density value of a single pixel) obtained from pixels referred to (pixels included in a pixel region) by eliminating a specific number of pixels with high densities and a specific number of pixels with low densities may be used as a local density value. Alternatively a density average value of pixels with high density values obtained from pixels referred to by eliminating a specific number of pixels with low densities may be used as a local density value. Further alternatively, although the same weight is given to all the pixels of the pixel region in FIG. 6, a weighted density average value obtained by giving a large weight to the current point and smaller weights to pixels disposed farther from the current point may be used.

Furthermore, the positions and the number of reference pixels including and surrounding the current point are not limited to those shown in the drawing. For example, when the resolution is different between the main scanning direction and the sub-scanning direction of an input image, the number of reference pixels can be made different between the main scanning direction and the sub-scanning direction. Moreover, from the viewpoint of a constant pixel distance from the current point, the position of reference pixels may be a range (a pixel region) in a circular shape apart from a square (or rectangular) shape with the current point disposed at the center. Alternatively, in order to reduce the complexity of calculation, a plurality of pixels disposed on the same line as the current point and a plurality of pixels disposed on the same column as the current point may be used as the reference pixels.

The first filter operation section 53 performs a filter operation on input image data by using a filter coefficient for a predetermined filter operation. FIG. 7 is an explanatory diagram showing an example of a reference pixel region used for the filter operation. As shown in FIG. 7, pixels disposed in a region (a reference pixel region) including (2H+1) pixels arranged along the main scanning direction of the input image, namely, along the pixel column direction of the CCD line sensor and (2V+1) pixels arranged along the sub-scanning direction of the image, namely, along the scanning direction of the CCD line sensor, are referred to as reference pixels, and the operation is performed by using the reference pixels and a spatial filter kernel described below. The result of the operation is outputted as a result based on a current point (x, y) (a current pixel) corresponding to the center of the reference pixel region.

Figure 8:
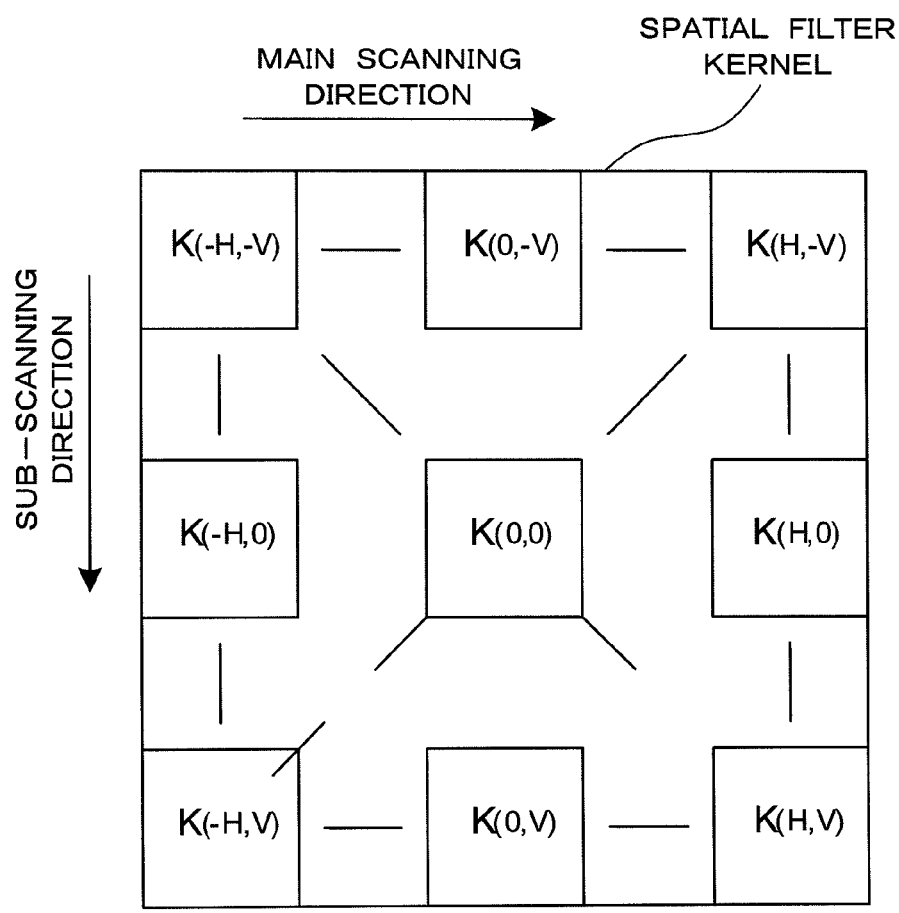
FIG. 8 is an explanatory diagram showing an example of the structure of a spatial filter kernel.

FIG. 8 is an explanatory diagram showing an example of the structure of the spatial filter kernel. As shown in FIG. 8, the spatial filter kernel has a size corresponding to the reference pixel region, and includes filter coefficients K(−H, −V), . . . , K(0, 0), . . . , K(H, V) for the filter operation. The first filter operation section 53 performs a convolution operation according to the following Expression (1):

$$O(x, y) = \frac{\sum_{j=-V}^{+V} \sum_{i=-H}^{+H} \{K(i, j) \cdot I(i, j)\}}{\sum_{j=-V}^{+V} \sum_{i=-H}^{+H} K(i, j)} \quad \text{Expression (1)}$$

wherein O(x, y) indicates the result of the filter operation performed on a current point (x, y), and I(i, j) indicates a coordinate of a reference pixel.

The first filter operation section 53 executes a smoothing process on input image data by using a filter coefficient K for the filter operation. FIG. 9 is an explanatory diagram showing an example of filter coefficients used by the first filter operation section 53. As shown in FIG. 9, the spatial filter kernel (filter coefficients) includes 49 filter coefficients K respectively correspondingly to a reference pixel region of 7 pixels by 7 pixels. The convolution operation is performed on each reference pixel by using a coefficient set composed of positive coefficients. In this manner, the result of the filter process with a smooth characteristic using reference pixels disposed in a wide region of 7×7 pixels can be obtained.

The second filter operation section 54 has substantially the same configuration as the first filter operation section 53, whereas filter coefficients K for a filter operation performed by the second filter operation section 54 are different from the filter coefficients K used by the first filter operation section 53. FIG. 10 is an explanatory diagram showing an example of the filter coefficients used by the second filter operation section 54. As shown in FIG. 10, the spatial filter kernel includes 49 filter coefficients K respectively correspondingly to a reference pixel region of 7 pixels by 7 pixels. The convolution operation is performed on each reference pixel by using a coefficient set composed of positive and negative coefficients. In this manner, the result of a filter process having both an enhancement characteristic and a smooth characteristic can be obtained. It is noted that a process having two different characteristics is not limited to this but the process may have the enhancement characteristic alone or may be a combination of a strong smooth characteristic and a weak smooth characteristic.

The mixing ratio calculation section 52 generates weighting coefficients (mixing ratios) α and β in accordance with the local density value calculated by the local density calculation section 51, and outputs the generated weighting coefficients α and β to the weight process section 55. The weight process section 55 multiplies the operation result obtained by the first filter operation section 53 by the weighting coefficient α by the multiplier 551, multiplies the operation result obtained by the second filter operation section 54 by the weighting coefficient β by the multiplier 552, adds the multiplied values obtained by the multipliers 551 and 552 to each other by the adder 553, and outputs the resultant as a process result of the spatial filter process section 50.

FIG. 11 is an explanatory diagram showing an example of the weighting coefficients α and β. In FIG. 11, the abscissa indicates the local density value calculated by the local density calculation section 51, and the ordinate indicates a weighting value. As shown in FIG. 11, in a region with a small local density value (namely in a low density region), the weighting coefficient α is set to 0 and the weighting coefficient β is set to 1. In this case, the result of the spatial filter process accords with the output of the second filter operation section 54, namely, corresponds to the result of the filter process having both the enhancement characteristic and the smooth characteristic shown in FIG. 10.

Alternatively, in a region with a large local density value (namely, in a high density region), the weighting coefficient α is set to 1 and the weighting coefficient β is set to 0. In this case, the result of the spatial filter process accords with the output of the first filter operation section 53, namely, corresponds to the result of the filter process with the smooth characteristic shown in FIG. 9. In a region where the local density value is changed from a low density to a high density the weighting coefficients α and β may be continuously changed so that, for example, α+β can be 1.

As shown in FIG. 11, the weighting coefficient α is increased from 0 at a point corresponding to a local density value D1. The local density value D1 can be set, for example, to be on a higher density side than a point corresponding to an output value attaining an amplification factor (gain) of 1 or more against an input value by the visual sensitivity correction section 30. Assuming that the output value attaining an amplification factor of 1 or more in employing, for example, the characteristic shown in FIG. 1 is substantially 150, when the local density value D1 is set to 105 (255-150), for example, noise amplified and mixed in the visual sensitivity correction section 30 can be cancelled through the smoothing process. On the other hand, it is apprehended that a boundary between a text and a background of the text (a text edge area) may be made dull and the text may be blurred through the smoothing process, and in consideration of such a harmful influence, the point at which the weighting coefficient α is increased from 0 is preferably closer to the high density side. Therefore, in order to suppress both the image quality degradation due to noise and the blur of a text edge area due to the smoothing process, the local density value D1 can be set to a value between 105 and 255.

On the other hand, the weighting coefficient α is set to 1 at a point corresponding to a local density value D2. The local density value D2 can be set to, for example, a high density value not corresponding to a text edge area and specifically, set to 250. Since a text edge area is an area where a density of a page background and a density of an image area are both present, and hence, such an area never has a high density value as high as 250.

In a region between the local density values D1 and D2, the weighting coefficients α and β are changed so as to satisfy the relationship of α+β=1. In this manner, even when an input value is continuously changed, an output value can be prevented from abruptly changing, and at the same time, while suppressing noise caused in a high density region by performing the filter operation with the smooth characteristic, the filter operation with the mixed characteristic is performed in a region other than a high density region, resulting in obtaining a good result of the image processing with an edge kept.

The smooth characteristic employed for suppressing the noise amplified in a high density region (a dark portion) through the operation performed by the first filter operation section 53 by using the filter coefficient set as shown in FIG. 9 is not limited to one described above. For example, in the case where pixels of an image are expressed by using frequency components with the main scanning direction and the sub-scanning direction regarded as cross axes of two-dimensional fundamental periods, frequency characteristics of externally mixed noise are distributed over frequencies of a lower dimension (lower frequencies). Therefore, any of various filter coefficients can be used as far as they have a filtering characteristic for attenuating the frequency band of the noise.

In the exemplified case, the FIR (Finite Impulse Response) type convolution operation using the 49 pixels arranged in 7 pixels in the main scanning direction by 7 pixels in the sub-scanning direction is employed as the filter operation. The filter operation with a predetermined smooth characteristic, the filter operation with the enhancement characteristic for amplifying a specific frequency band, or the filter operation with the mixed characteristic, that is, the smooth characteristic for attenuating a specific frequency band and the enhancement characteristic for amplifying another specific frequency band, is not limited to that described above. For example, an IIR (Infinite Impulse Response) type filter operation may be employed. As the IIR type filter operation, for example, a result of a filter process having been performed at a front stage and input image data are used for constructing a feedback filter. Also in employing the FIR filter operation, the position and the number of reference pixels including and surrounding a current point are not limited to the above-described 49 pixels arranged in 7 pixels along the main scanning direction by 7 pixels along the sub-scanning direction. For example, when the resolution is different between the main scanning direction and the sub-scanning direction of an input image, the number of reference pixels and the number of coefficients of a coefficient set may be different between the scanning direction and the sub-scanning direction in performing the convolution operation. As the frequency band to be employed is larger, the number of reference pixels arranged in the main scanning direction and the number of reference pixels arranged in the sub-scanning direction are increased. The position and the number of reference pixels and the type of the filter operation can be determined appropriately in consideration of trade-off between package cost for attaining a desired filter characteristic (such as the complexity of calculation and the circuit scale) and an effect attained.

Figure 12:
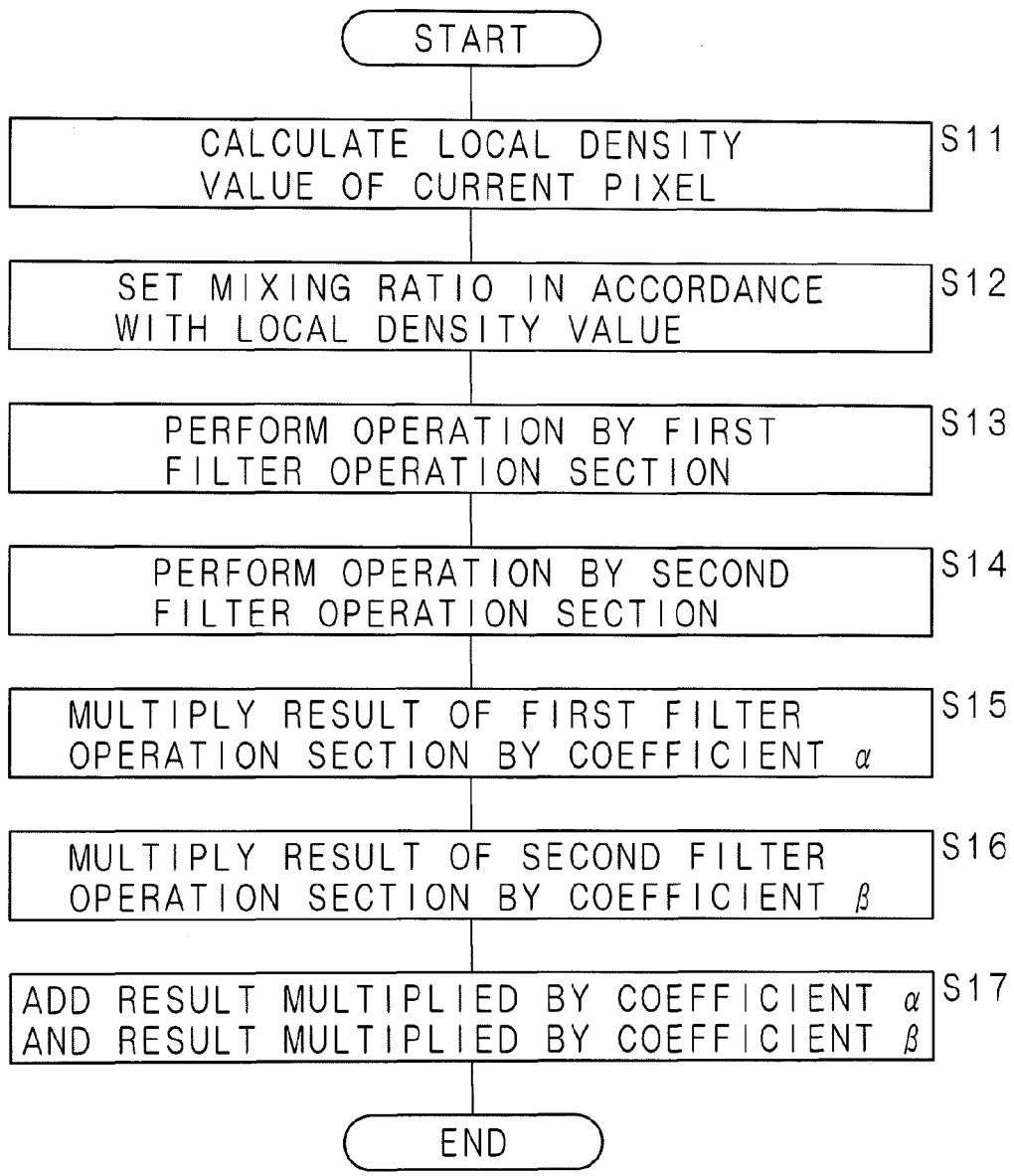
FIG. 12 is a flowchart showing exemplified procedures in a spatial filter process performed by an image process section.

The operation of the image process section 100 will now be described. FIG. 12 is a flowchart showing exemplified procedures in the spatial filter process performed by the image process section 100. The spatial filter process section 50 calculates a local density value of a current pixel (S11) and sets the weighting coefficients (mixing ratios) $\alpha$ and $\beta$ in accordance with the local density value (S12). The spatial filter process section 50 performs the filter operation on input image data by using the first filter operation section 53 (S13) and performs the filter operation on the input image data by using the second filter operation section 54 (S14).

The procedures in steps S11 and S12, and the procedures in steps S13 and S14 can be executed in parallel. The spatial filter process section 50 multiplies the result obtained by the first filter operation section 53 by the coefficient $\alpha$ (S15), multiplies the result obtained by the second filter operation section 54 by the coefficient $\beta$ (S16), adds the result multiplied by the coefficient $\alpha$ and the result multiplied by the coefficient $\beta$ to each other (S17), and terminates the operation.

As described so far, noise in a high density region can be suppressed, and since the noise is suppressed, increase of an average density caused through the filter process due to the noise can be suppressed, so as to prevent the image quality degradation. Furthermore, in a low density region (such as a bright portion corresponding to a background area), the degradation of an edge can be prevented. In addition, since the weighting coefficients (mixing ratios) $\alpha$ and $\beta$ are continuously changed as the density of a pixel region (local density value) is changed from a low density side to a high density side, even when the density of an input image is changed, abrupt change in the density of an output image can be suppressed, and hence, the image quality degradation can be further definitely prevented.

Embodiment 2

In Embodiment 1, the weighting coefficients (mixing ratios) $\alpha$ and $\beta$ are calculated by the mixing ratio calculation section 52 on the basis of the local density value calculated by the local density calculation section 51 so as to weight the operation results obtained by the first filter operation section 53 and the second filter operation section 54. In contrast, the weighting coefficients (mixing ratios) can be calculated on the basis of a segmentation class signal corresponding to an area attribute of an input image or a pixel block including a plurality of pixels.

Figure 13:
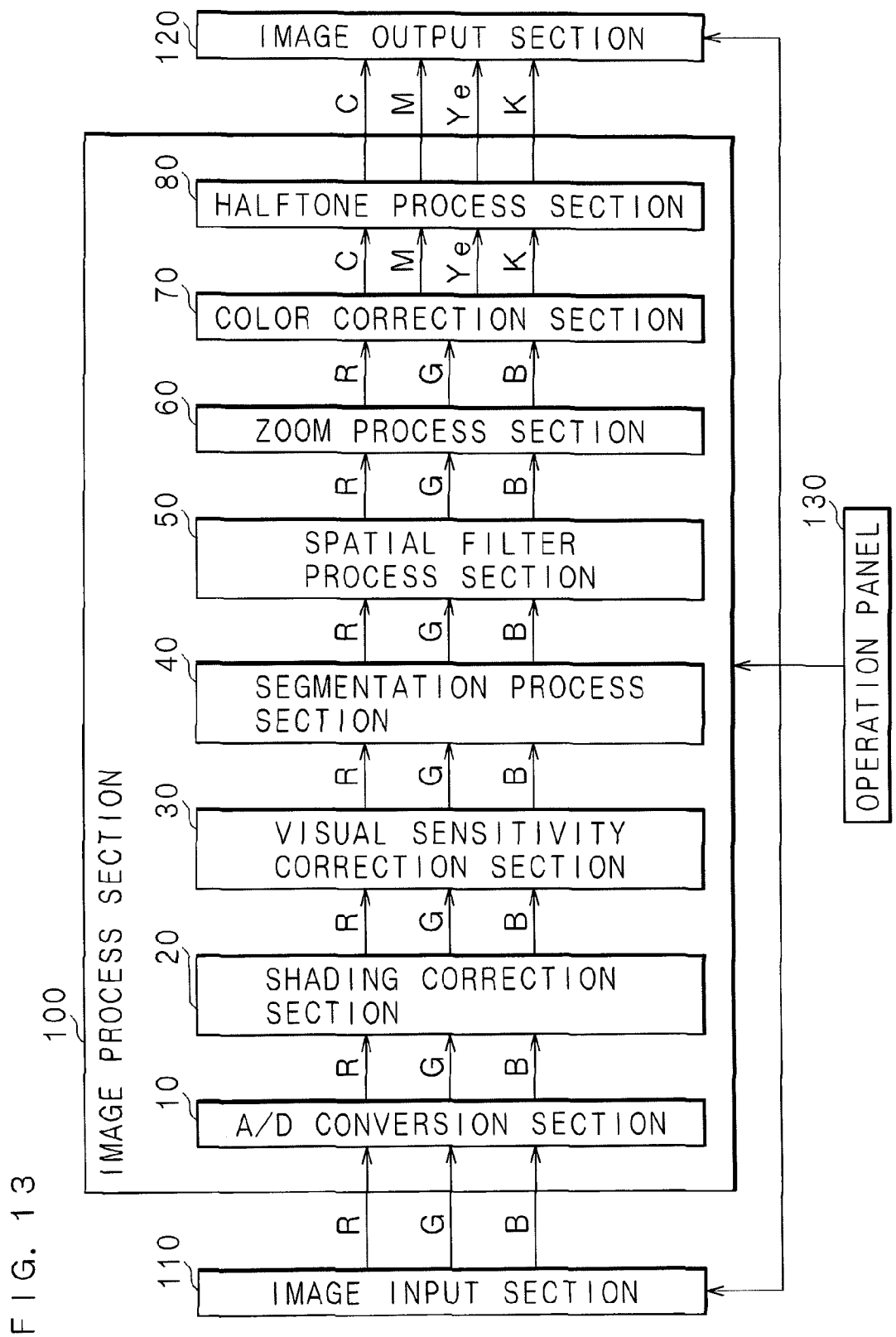
FIG. 13 is a block diagram showing the configuration of an image forming apparatus including an image processing apparatus according to Embodiment 2.

FIG. 13 is a block diagram showing the configuration of an image forming apparatus including an image processing apparatus according to Embodiment 2. An image process section 100 further includes a segmentation process section (area image discrimination section) 40 in addition to the composing elements of Embodiment 1. The segmentation process section 40 classifies, on the basis of RGB signals outputted from a visual sensitivity correction section 30, each pixel of an input image into any of a text edge area, a halftone area or an other area. The segmentation process section 40 outputs, on the basis of the classification result, a segmentation class signal A corresponding to the classified area of the pixel to a spatial filter process section 50, a color correction section 70 and a halftone process section 80 as well as outputs an input signal received from the visual sensitivity correction section 30 to the spatial filter process section 50 disposed at the following stage without any modification.

An area classified as a text by the segmentation process section 40 is subjected to an edge enhancement process for increasing reproducibility of the text in particular in the spatial filter process section 50 and is subjected to a process for increasing the quantity of black generation in the color correction section 70. Furthermore, in the halftone process section 80, the binarization or multi-level dither method or the error diffusion method suitable to reproduction of a high frequency component is selected.

An area classified as a halftone by the segmentation process section 40 is subjected to a smoothing process, a filter process with both an enhancement characteristic and a smooth characteristic or a process with a smooth characteristic and a mixed characteristic of an enhancement characteristic and a smooth characteristic in accordance with the local density value of the pixel in the spatial filter process section 50. Furthermore, a process employing the binarization or multi-level dither method or the error diffusion method suitable for tone reproduction is performed in the halftone process section 80.

Figure 14:
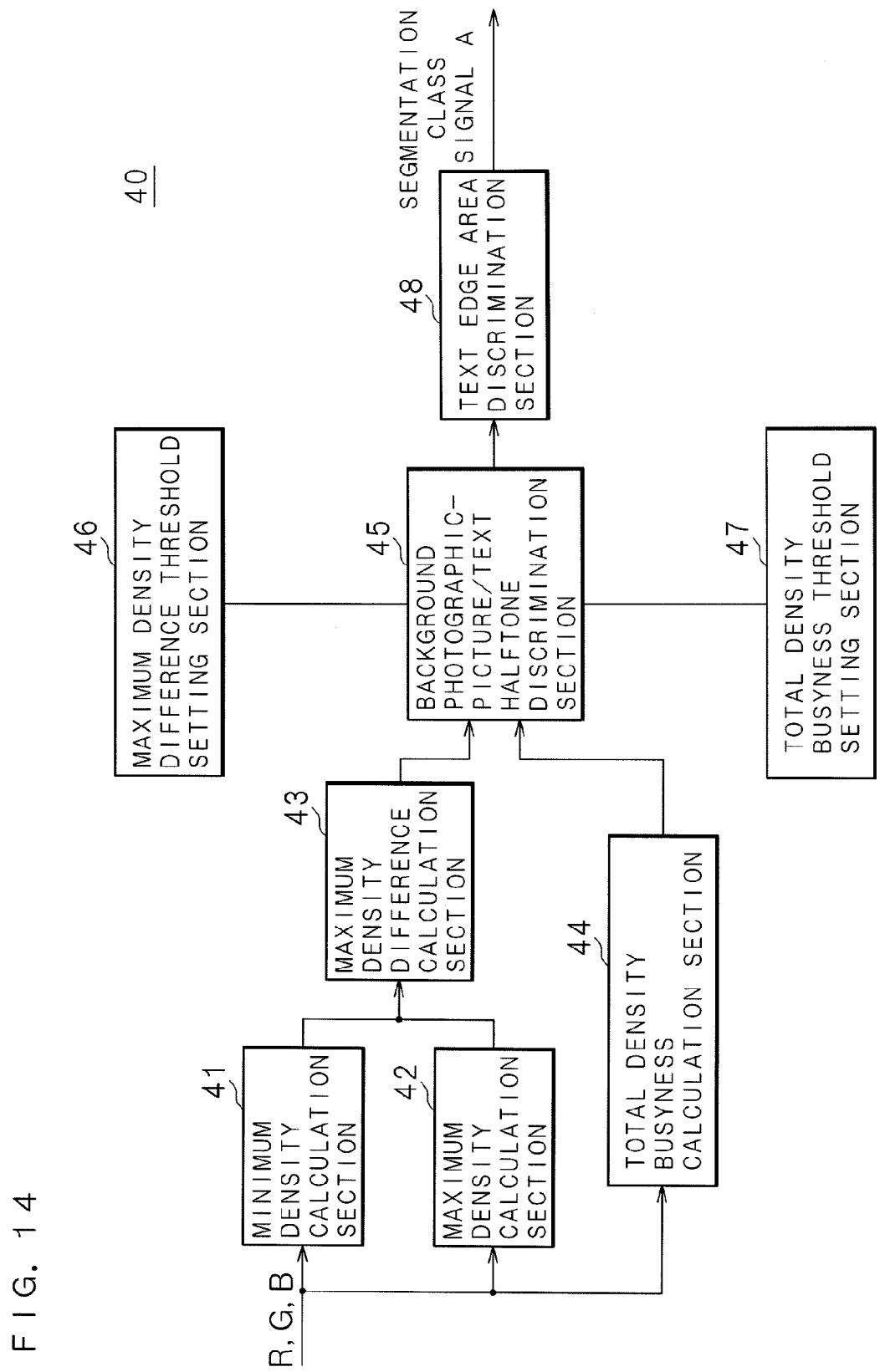
FIG. 14 is a block diagram showing the configuration of a segmentation process section.

FIG. 14 is a block diagram showing the configuration of the segmentation process section 40. The segmentation process section 40 includes a minimum density calculation section 41, a maximum density calculation section 42, a maximum density difference calculation section 43, a total density busyness calculation section 44, a background photographic-picture/text halftone discrimination section 45, a maximum density difference threshold setting section 46, a total density busyness threshold setting section 47, a text edge area discrimination section 48 and the like.

The minimum density calculation section 41 calculates a minimum density in a pixel block of n×m pixels (of for example, 15×15 pixels) including a current pixel, and the maximum density calculation section 42 calculates a maximum density in the pixel block of n×m pixels (of, for example, 15×15 pixels) including the current pixel. The maximum density difference calculation section 43 calculates a maximum density difference corresponding to a difference between the calculated maximum density and the calculated minimum density.

The total density busyness calculation section 44 calculates total density busyness, which corresponds to a sum of absolute values of density differences between adjacent pixels of the pixel block of n×m pixels (of, for example, 15×15 pixels) including the current pixel.

Since the density is minimally changed in a density distribution of a background area, the maximum density difference and the total density busyness are both very small. In the density distribution of a photographic-picture area (which herein means an area with a continuous tone like a photographic-picture (that is, a picture printed on photographic paper)), the density is smoothly changed, and hence, the maximum density difference and the total density busyness are both small and rather larger than those of a background area. In other words, in a background area and a photographic-picture area (corresponding to an other area), the maximum density difference and the total density busyness both have a small value.

In the density distribution of a halftone area, the maximum density difference is varied depending upon the halftone, and since there are density changes in number corresponding to the number of halftone dots, a proportion of the total density busyness to the maximum density difference is large. Accordingly, in the case where the total density busyness is larger than a product of the maximum density difference and a prescribed text/halftone discrimination threshold value, this area can be discriminated as a halftone pixel.

In the density distribution of a text edge area, the maximum density difference is large and hence the total density busyness is also large, but since the density change is smaller than in a halftone area, the total density busyness is smaller than in a halftone area. Accordingly, in the case where the total density busyness is smaller than a product of the maximum density difference and a prescribed text/halftone discrimination threshold value, this area can be discriminated as a text edge pixel.

The background photographic-picture/text halftone discrimination section 45 compares the calculated maximum density difference with the maximum density difference threshold value set by the maximum density difference threshold setting section 46 and compares the calculated total density busyness with the total density busyness threshold value set by the total density busyness threshold setting section 47. When the maximum density difference is smaller than the maximum density threshold value and the total density busyness is smaller than the total density busyness threshold value, the background photographic-picture/text halftone discrimination section 45 determines that the current pixel is an other area (namely, a background/photographic-picture area), and when the maximum density difference is larger than the maximum density threshold value or the total density busyness is larger than the total density busyness threshold value, it determines that the target pixel is a text/halftone area.

When the target pixel is determined by the background photographic-picture/text halftone discrimination section 45 to be a text/halftone area, the text edge area discrimination section 48 compares the calculated total density busyness with a value obtained by multiplying the maximum density difference by a text/halftone discrimination threshold value. When the total density busyness is smaller, the current pixel is determined to be a text edge area, and when the total density busyness is larger, it is determined to be a halftone area, and the text edge area discrimination section 48 outputs a discrimination signal (segmentation class signal) A. In this manner, a current pixel can be classified into any of a text edge area, a halftone area or an other area.

Figure 15:
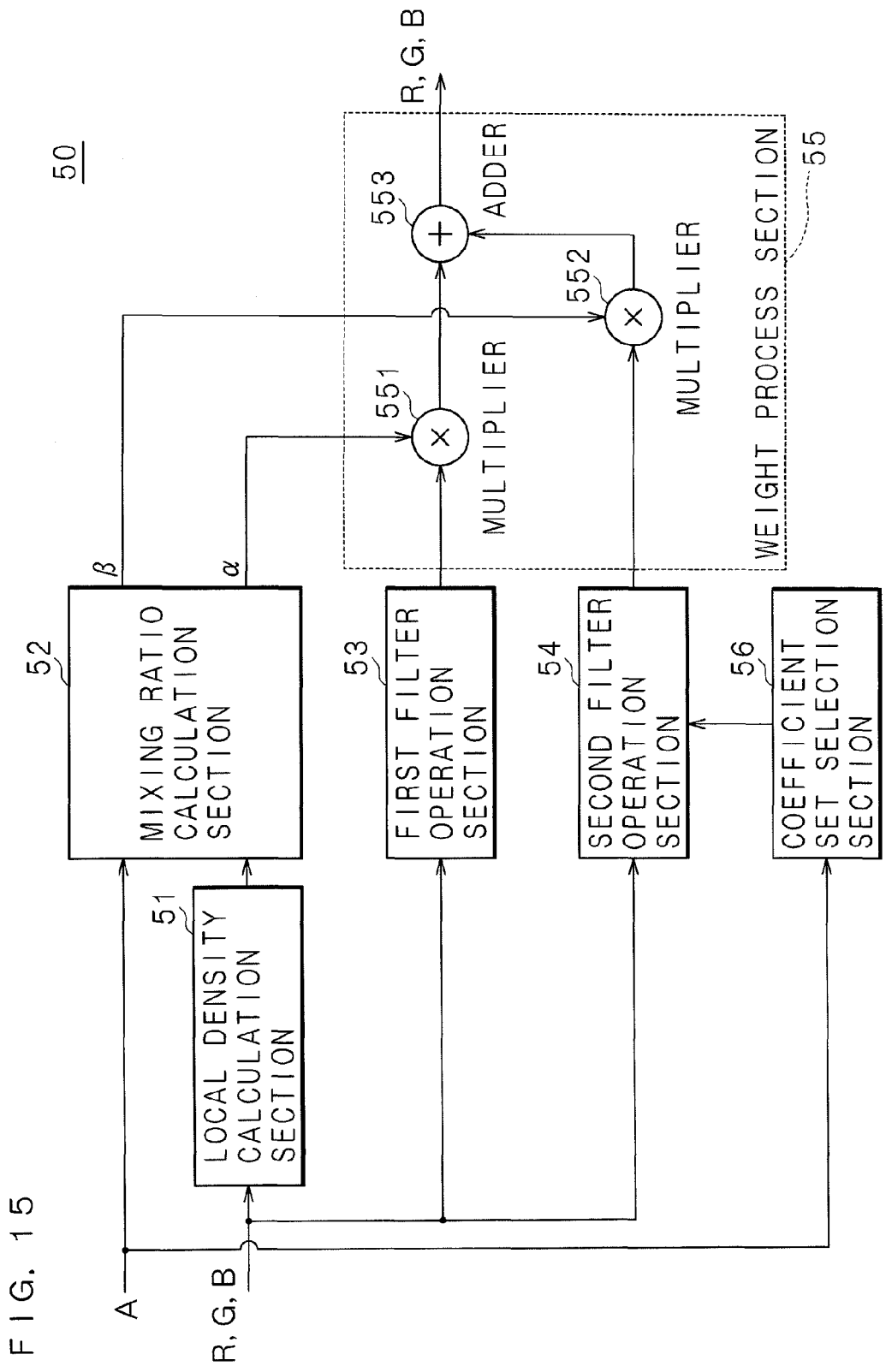
FIG. 15 is a block diagram showing an example of the configuration of a spatial filter process section of Embodiment 2.

FIG. 15 is a block diagram showing an example of the configuration of the spatial filter process section 50 of Embodiment 2. A local density calculation section 51, a first filter operation section 53 and a weight process section 55 are the same as those of Embodiment 1, and hence, the description is omitted.

A coefficient set selection section 56 stores a filter coefficient set with the mixed characteristic of the enhancement characteristic and the smooth characteristic as shown in FIG. 10 and a filter coefficient set with an enhancement characteristic described below. The coefficient set selection section 56 selects a filter coefficient set in accordance with the segmentation class signal A, and outputs the selected filter coefficient set to a second filter operation section 54. For example, when the segmentation class signal A corresponds to a text edge area, a filter coefficient set with an enhancement characteristic is selected, and when the segmentation class signal A corresponds to a halftone area or an other area (namely an area other than a text edge area), a filter coefficient set with the mixed characteristic of the enhancement characteristic and the smooth characteristic is selected.

FIG. 16 is an explanatory diagram showing an example of the filter coefficient set with the enhancement characteristic. A filter coefficient with an enhancement characteristic or an edge enhancement characteristic is used for enhancing a comparatively high spatial frequency component in order to prevent blur caused in a text edge portion because a high spatial frequency component is weakened as compared with a low spatial frequency component. The filter coefficient set of FIG. 16 is shown merely as an example and the filter coefficient set with the enhancement characteristic is not limited to this.

A mixing ratio calculation section 52 sets, based on the local density value calculated by the local density calculation section 51 and the segmentation class signal A, weighting coefficients (mixing ratios) α and β, and outputs the set weighting coefficients α and β to the weight process section 55.

FIG. 17 is an explanatory diagram showing an example of setting of the weighting coefficients α and β. As shown in FIG. 17, when the segmentation class signal A corresponds to a text edge area, the mixing ratio calculation section 52 sets the weighting coefficient α to 0 and the weighting coefficient β to 1 regardless of the local density value. When the segmentation class signal A corresponds to a text edge area, the coefficient set selection section 56 selects the filter coefficient set with the enhancement characteristic, and the result of the spatial filter process accords with the output of the second filter operation section 54, namely, the result of the filter process with the enhancement characteristic. Specifically, image data with a text edge enhanced is outputted.

When the segmentation class signal A corresponds to a halftone area or an other area (namely, an area other than a text edge area) and the local density value is large (of, for example, 250 or more), the mixing ratio calculation section 52 sets the weighting coefficient α to 1 and the weighting coefficient β to 0. In this case, the result of the spatial filter process accords with the output of the first filter operation section 53, namely, smoothed image data is obtained.

When the segmentation class signal A corresponds to a halftone area or an other area (namely, an area other than a text edge area) and the local density value is small (of, for example, 105 or less), the mixing ratio calculation section 52 sets the weighting coefficient α to 0 and the weighting coefficient R to 1. When the segmentation class signal A corresponds to a halftone area or an other area, the coefficient set selection section 56 selects the filter coefficient set with the mixed characteristic of the enhancement characteristic and the smooth characteristic, and therefore, the filter process with both the enhancement characteristic and the smooth characteristic is performed.

When the segmentation class signal A corresponds to a halftone area or an other area (namely, an area other than a text edge area) and the local density has an intermediate value (of, for example, 105 through 250), the mixing ratio calculation section 52 sets the weighting coefficient α to "1−a" and the weighting coefficient β to "a" (whereas 0<a<1). When the segmentation class signal A corresponds to a halftone area or an other area, the coefficient set selection section 56 selects the filter coefficient set with both the enhancement characteristic and the smooth characteristic, and a process in which the filter operation using the filter coefficient set with the enhancement characteristic and the smooth characteristic performed by the second filter operation section 54 and the filter operation using the filter coefficient set with the smooth characteristic performed by the first filter operation section 53 are mixed in accordance with the density value is performed.

As described so far, since the method for performing the filter process is changed with respect to a halftone area or an other area in accordance with the local density value, the amplification of noise included in input image data is suppressed through the smoothing process in a high density region of a halftone area or an other area, and in a low density region of a halftone area or an other area, the filter process with both the enhancement characteristic and the smooth characteristic is performed so as to improve the MTF characteristic of a low frequency component as well as to remove an unnecessary high frequency component.

Figure 18:
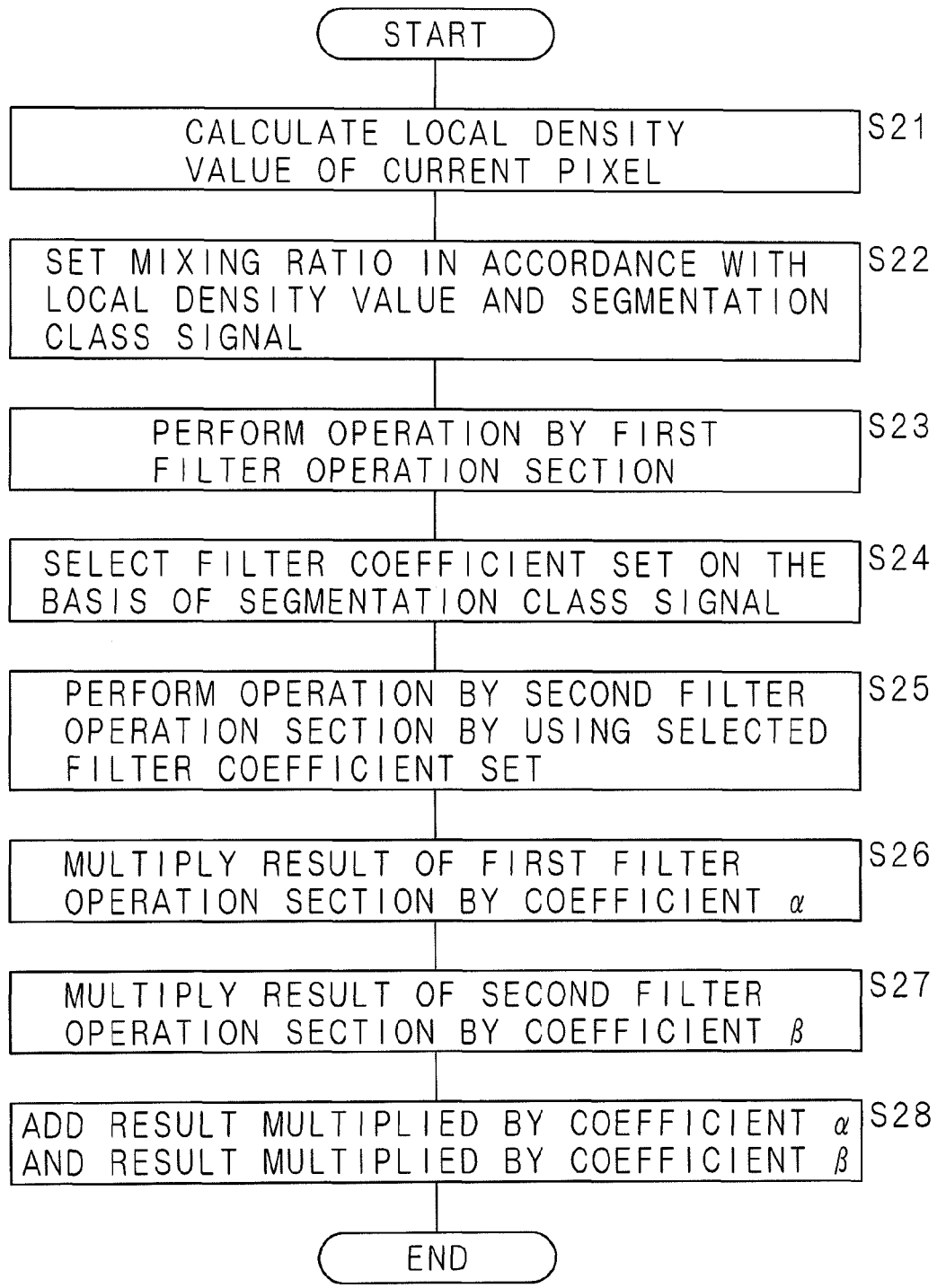
FIG. 18 is a flowchart showing exemplified procedures in a spatial filter process performed by an image process section of Embodiment 2.

The operation of the image process section 100 of Embodiment 2 will now be described. FIG. 18 is a flowchart showing exemplified procedures in the spatial filter process performed by the image process section 100 of Embodiment 2. The spatial filter process section 50 calculates a local density value of a current pixel (S21) and sets the weighting coefficients (mixing ratios) α and β in accordance with the local density value and a segmentation class signal (S22).

The spatial filter process section 50 performs the filter operation on input image data in the first filter operation section 53 (S23), selects a filter coefficient set on the basis of the segmentation class signal (S24), and performs the filter operation on the input image data by using the selected filter coefficient set in the second filter operation section 54 (S25). The procedures in steps S21 and S22 and the procedures of step S23 and steps S24 and S25 can be executed in parallel. The spatial filter process section 50 multiplies the operation result obtained by the first filter operation section 53 by the coefficient α (S26), multiplies the operation result obtained by the second filter operation section 54 by the coefficient β (S27), adds the operation result multiplied by the coefficient α and the operation result multiplied by the coefficient β to each other (S28), and terminates the operation.

As described so far, since a text edge area is eliminated in performing the smoothing process, while preventing the degradation of a text edge, noise amplified in a high density region can be suppressed through the smoothing process, resulting in preventing the image quality degradation. Furthermore, since the filter process with the enhancement characteristic is performed in a text edge area and the filter process with both the enhancement characteristic and the smooth characteristic is performed in accordance with the local density value in an area other than a text edge area, the degradation of an edge can be prevented by keeping the edge. In addition, since the weighting coefficients (mixing ratios) α and β are continuously changed as the density of a pixel region (local density value) is changed from a low density side to a high density side, even when the density of an input image is changed, abrupt change in the density of an output image can be suppressed, and hence, the image quality degradation can be further definitely prevented.

Embodiment 3

The spatial filter process section 50 of Embodiment 1 or 2 described above includes the two filter operation sections, that is, the first filter operation section 53 and the second filter operation section 54, which does not limit the configuration of the spatial filter process section 50. When a plurality of filter coefficients are mixed for generating one filter coefficient to be used in a filter operation, one filter operation section can be commonly used in different filter processes.

Figure 19:
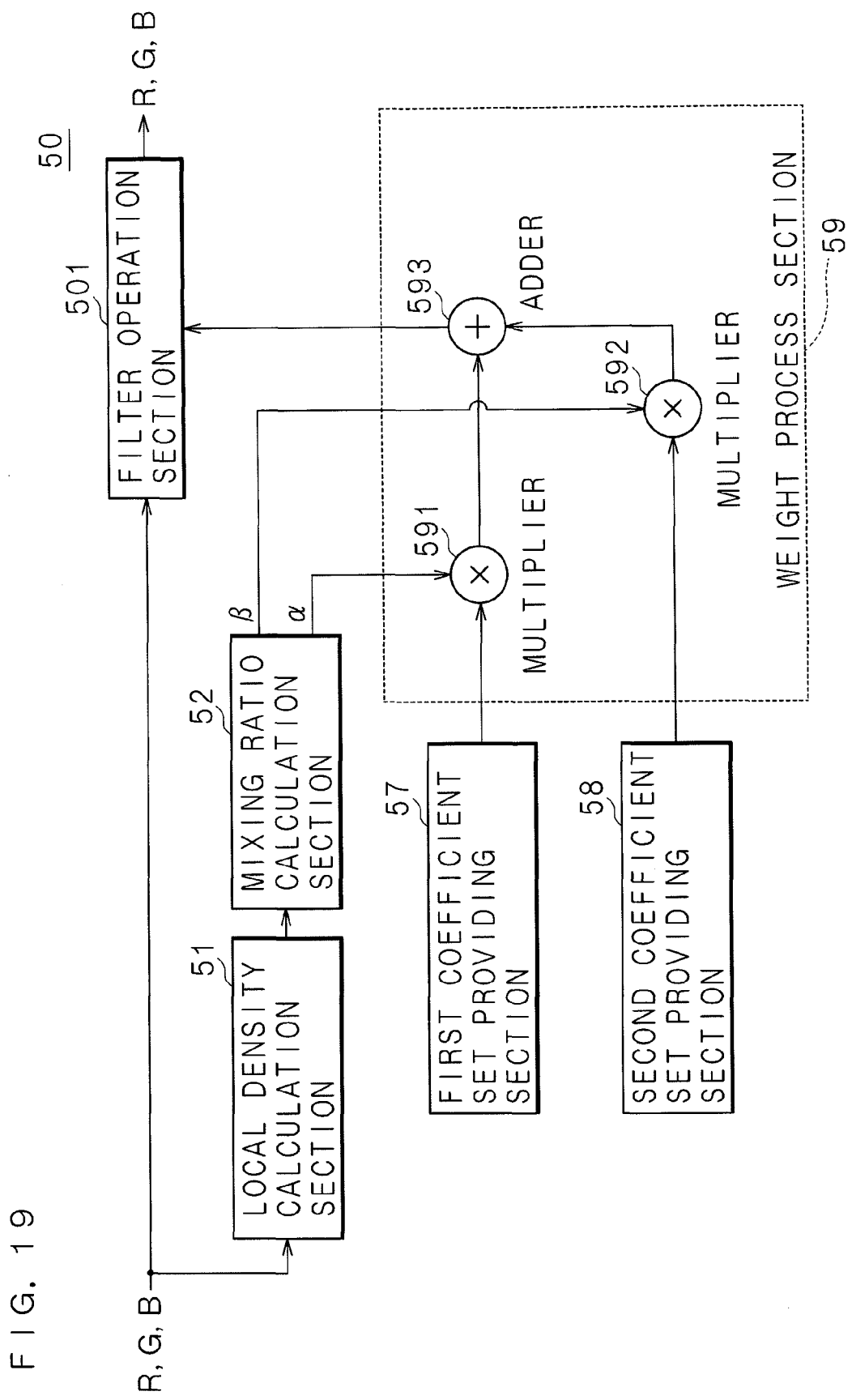
FIG. 19 is a block diagram showing an example of the configuration of a spatial filter process section of Embodiment 3.

FIG. 19 is a block diagram showing an example of the configuration of a spatial filter process section 50 of Embodiment 3. In Embodiment 3, the spatial filter process section 50 includes a local density calculation section 51, a mixing ratio calculation section 52, a first coefficient set providing section 57, a second coefficient set providing section 58, a weight process section 59, a filter operation section 501 and the like, and the weight process section 59 includes multipliers 591 and 592 and an adder 593. Since the local density calculation section 51 and the mixing ratio calculation section 52 are the same as those described in Embodiments 1 and 2, the description is omitted.

The first coefficient set providing section 57 stores a filter coefficient set with a smooth characteristic, and the second coefficient set providing section 58 stores a filter coefficient set that is different from that stored in the first coefficient set providing section 57 and has, for example, a mixed characteristic of an enhancement characteristic and a smooth characteristic. The weight process section 59 multiplies a filter coefficient fetched from the first coefficient set providing section 57 by a weighting coefficient α calculated by the mixing ratio calculation section 52, multiplies a filter coefficient fetched from the second coefficient set providing section 58 by a weighting coefficient β calculated by the mixing ratio calculation section 52, generates one filter coefficient (mixed filter coefficient) by adding the filter coefficients respectively multiplied by the weighting coefficients α and β, and outputs the generated filter coefficient to the filter operation section 501. The filter operation section 501 performs a convolution operation of input image data by using the filter coefficient generated by mixing the two sets of filter coefficients.

Figure 20:
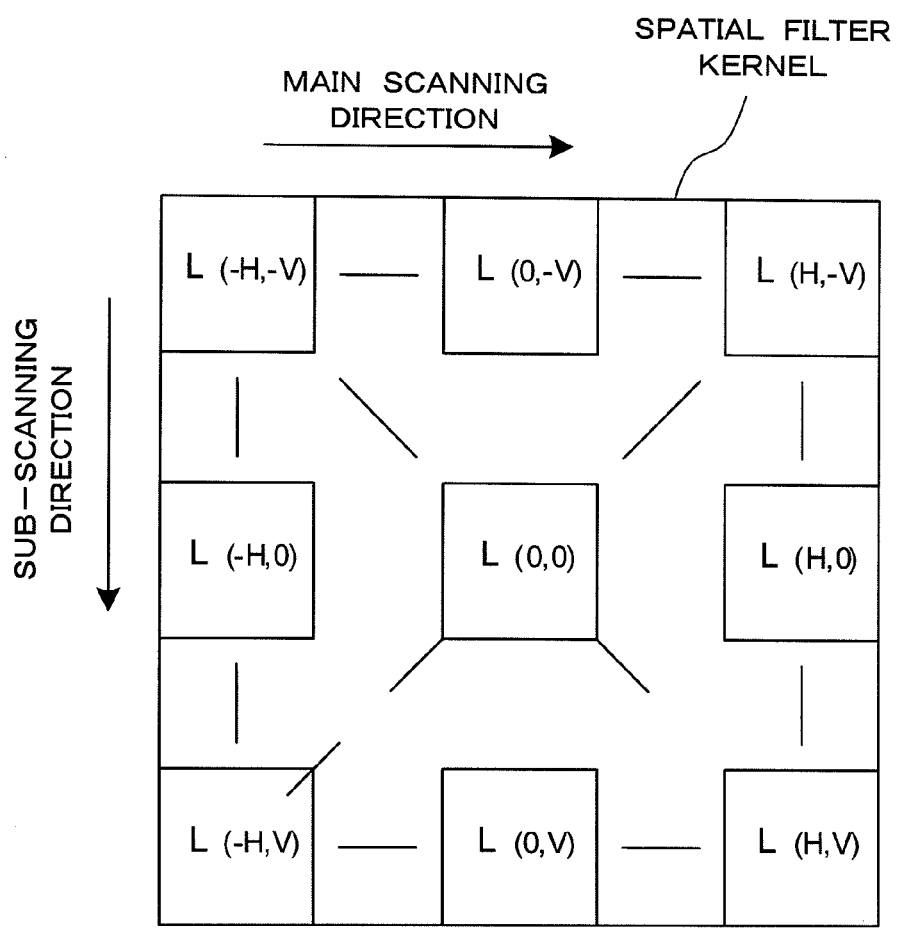
FIG. 20 is an explanatory diagram showing an example of the structure of a spatial filter kernel.

At this point, the method for mixing filter coefficients will be described. FIG. 20 is an explanatory diagram showing an example of the structure of a spatial filter kernel. As shown in FIG. 20, the spatial filter kernel has a size corresponding to a reference pixel region, and includes coefficients L(−H, −V), . . . , L(0, 0), . . . , L(H, V) for the filter operation. It is herein assumed that the two kinds of filter coefficient set to be mixed are those shown in the example of FIG. 8 described above and shown in FIG. 20 and that the filter operation is performed on input image data I(i,j) by using the filter coefficients at a ratio of α:β (whereas α+β=1). When the result of the filter process performed on a current pixel is O(x, y), O(x, y) can be expressed by the following Expression (2):

$$O(x, y) = \frac{\sum_{j=-V}^{+V} \sum_{i=-H}^{+H} \alpha \cdot \{K(i, j) \cdot I(i, j)\}}{\sum_{j=-V}^{+V} \sum_{i=-H}^{+H} K(i, j)} +$$

$$\frac{\sum_{j=-V}^{+V} \sum_{i=-H}^{+H} \beta \{L(i, j) \cdot I(i, j)\}}{\sum_{j=-V}^{+V} \sum_{i=-H}^{+H} L(i, j)}$$

Expression (2)

$$\sum_{j=-V}^{+V} \sum_{i=-H}^{+H} K(i, j) = \sum_{j=-V}^{+V} \sum_{i=-H}^{+H} L(i, j) = Z$$

Expression (3)

$$O(x, y) = \frac{1}{Z} \left[ \sum_{j=-V}^{+V} \sum_{i=-H}^{+H} \{\alpha \cdot K(i, j) + \beta \cdot L(i, j)\} \cdot I(i, j) \right]$$

Expression (4)

When the filter coefficients are precedently normalized for satisfying Expression (3), O(x, y) can be expressed by Expression (4). The filter process performed on the input image data I(i, j) by using filter coefficients mixed in the ratio of α:β (whereas α+β=1) is equivalent to a filter process using a filter coefficient generated by mixing filter coefficients at the ratio of α:β.

Figure 21:
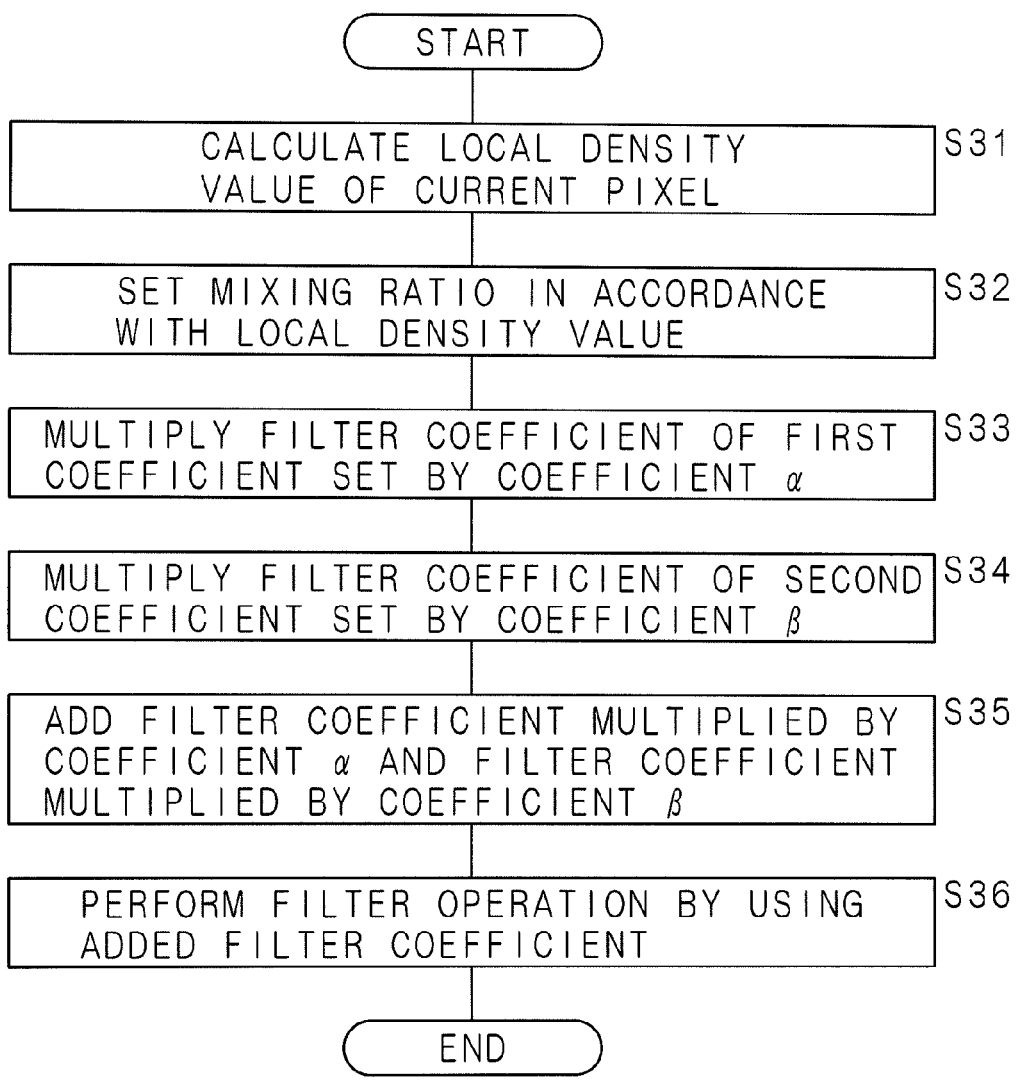
FIG. 21 is a flowchart showing exemplified procedures in a spatial filter process performed by an image process section of Embodiment 3.

The operation of an image process section 100 of Embodiment 3 will now be described. FIG. 21 is a flowchart showing exemplified procedures in the spatial filter process performed by the image process section 100. The spatial filter process section 50 calculates a local density value of a current pixel (S31) and sets the weighting coefficients (mixing ratios) α and β in accordance with the local density value (S32). The spatial filter process section 50 multiplies a filter coefficient fetched from the first coefficient set providing section 57 by the coefficient α (S33), and multiplies a filter coefficient fetched from the second coefficient set providing section 58 by the coefficient β (S34). The spatial filter process section 50 adds the filter coefficient multiplied by the coefficient α and the filter coefficient multiplied by the coefficient β to each other (S35), performs the filter operation on input image data by using the added filter coefficient (S36) and terminates the operation.

As described so far, one filter operation section is (commonly) used, and one filter coefficient is generated by mixing a plurality of filter coefficients in accordance with the density of a pixel region (local density value). Therefore, as compared with a case where, for example, a plurality of filter operation sections are provided for respectively performing filter operations, the throughput can be reduced. In particular, when the size of a filter (namely, the size of a filter matrix) is large, the throughput can be further reduced. Furthermore, when the number of kinds of filter coefficient values is small, the throughput can be optimized.

Embodiment 4

In Embodiment 3 described above, the second coefficient set providing section 58 stores the filter coefficient set different from that with the smooth characteristic stored in the first coefficient set providing section 57, which does not limit the invention. The second coefficient set providing section 58 may store a plurality of filter coefficient sets so as to select one filter coefficient set from the stored filter coefficient sets in accordance with a segmentation class signal A, and the weighting coefficients (mixing ratios) α and β calculated by the mixing ratio calculation section 52 may be set in accordance with the segmentation class signal A.

Figure 22:
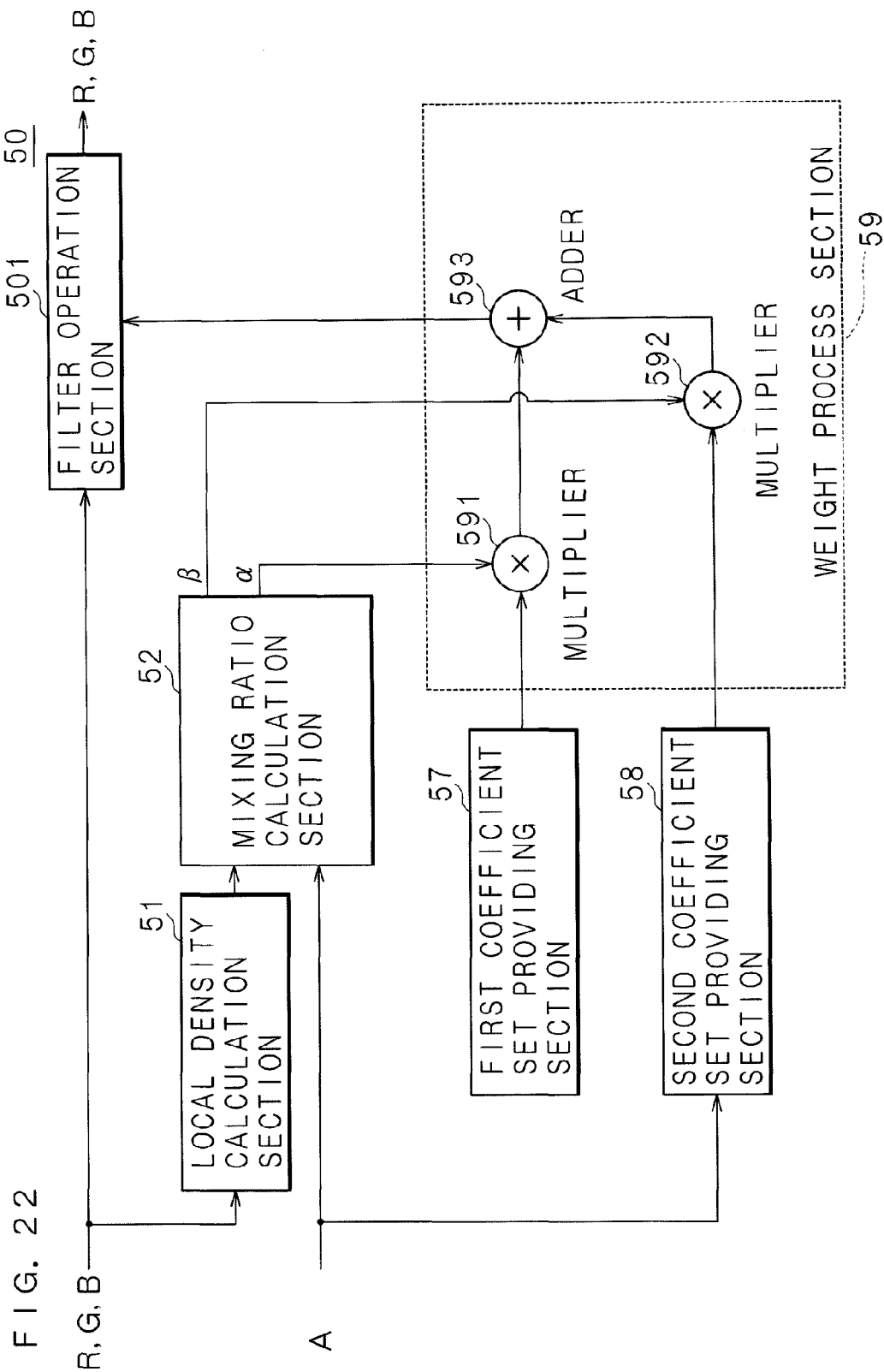
FIG. 22 is a block diagram showing an example of the configuration of a spatial filter process section of Embodiment 4.

FIG. 22 is a block diagram showing an example of the configuration of a spatial filter process section 50 of Embodiment 4. The configuration of the spatial filter process section 50 is substantially the same as that of Embodiment 3 but is different in the segmentation class signal A being outputted to the mixing ratio calculation section 52 and the second coefficient set providing section 58. The mixing ratio calculation section 52 calculates weighting coefficients α and β on the basis of a local density value outputted from the local density calculation section 51 and the segmentation class signal A. It is noted that the weighting coefficients are calculated in the same manner as described in Embodiment 2.

The second coefficient set providing section 58 stores, in the same manner as the coefficient set selection section 56 of Embodiment 2 (shown in FIG. 15), a filter coefficient set with the mixed characteristic of the enhancement characteristic and the smooth characteristic as shown in the example of FIG. 10, a filter coefficient set with the enhancement characteristic as shown in the example of FIG. 16 and the like. The second coefficient set providing section 58 selects a filter coefficient set in accordance with the segmentation class signal A, and outputs the selected filter coefficient set to a weight process section 59. For example, when the segmentation class signal A corresponds to a text edge area, the filter coefficient set with the enhancement characteristic is selected, and when the segmentation class signal A corresponds to a halftone area or an other area (namely, an area other than a text edge area), the filter coefficient set with the mixed characteristic of the enhancement characteristic and the smooth characteristic is selected. A first coefficient set providing section 57, a weight process section 59 and a filter operation section 501 are the same as those described in Embodiment 3 and hence the description is omitted.

Figure 23:
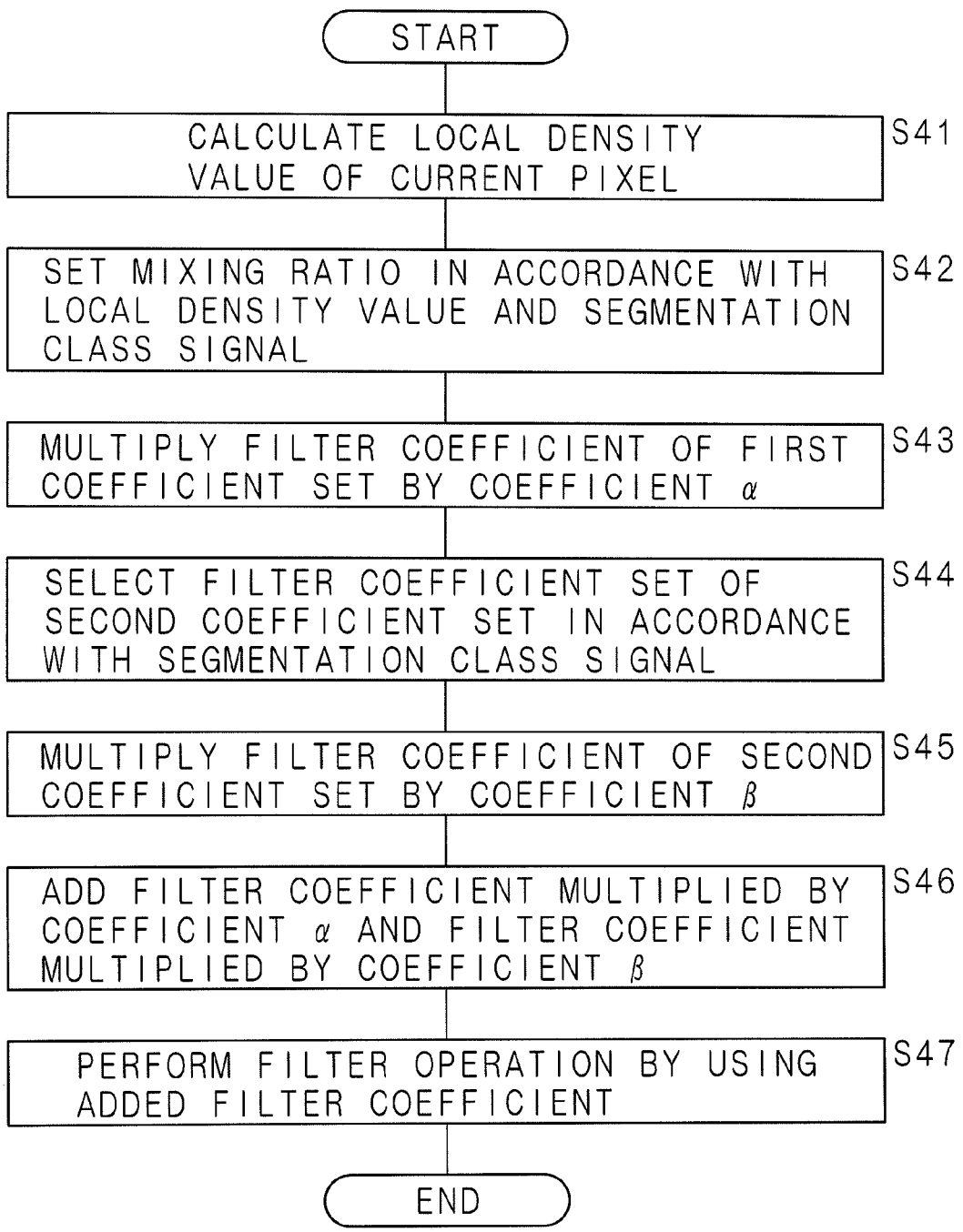
FIG. 23 is a flowchart showing exemplified procedures in a spatial filter process performed by an image process section of Embodiment 4.

The operation of an image process section 100 of Embodiment 4 will now be described. FIG. 23 is a flowchart showing exemplified procedures in the spatial filter process performed by the image process section 100. The spatial filter process section 50 calculates a local density value of a current pixel (S41) and sets the weighting coefficients (mixing ratios) α and β in accordance with the local density value and a segmentation class signal (S42).

The spatial filter process section 50 multiplies a filter coefficient fetched from the first coefficient set providing section 57 by the coefficient α (S43), selects a filter coefficient set of the second coefficient set providing section 58 in accordance with the segmentation class signal (S44), and multiplies a filter coefficient of the selected filter coefficient set fetched from the second coefficient set providing section 58 by the coefficient β (S45). The spatial filter process section 50 adds the filter coefficient multiplied by the coefficient α and the filter coefficient multiplied by the coefficient β to each other (S46), performs the filter operation on input image data by using the added filter coefficient (S47), and terminates the operation.

As described so far, since a text edge area is eliminated in performing the smoothing process, while preventing the degradation of a text edge, noise amplified in a high density region can be suppressed through the smoothing process, resulting in preventing the image quality degradation. Furthermore, since the filter process with the enhancement characteristic is performed in a text edge area and the filter process with both the enhancement characteristic and the smooth characteristic is performed in accordance with the local density value in an area other than a text edge area, the degradation of an edge can be prevented by keeping the edge. In addition, since the weighting coefficients (mixing ratios) α and β are continuously changed as the density of a pixel region (local density value) is changed from a low density side to a high density side, even when the density of an input image is changed, abrupt change in the density of an output image can be suppressed, and hence, the image quality degradation can be further definitely prevented.

Embodiment 5

The weighting coefficients (mixing ratios) α and β calculated by the mixing ratio calculation section 52 are set respectively to 1 and 0 at the point corresponding to the local density value D2 in the above embodiment, which does not limit the invention.

FIG. 24 is an explanatory diagram showing another example of the weighting coefficients α and β. In FIG. 24, the abscissa indicates the local density value calculated by the local density calculation section 51 and the ordinate indicates a weighting value. As shown in FIG. 24, the weighting coefficient α<1 and the weighting coefficient β>0 at the point corresponding to the local density value D2. In this case, a process result of the operation of the first filter operation section 53 corresponding to the smoothing process or the filter operation using a filter coefficient supplied by the first coefficient set providing section 57 and a process result of the operation of the second filter operation section 54 or the filter operation using a filter coefficient supplied by the second coefficient set providing section 58 are mixed to be outputted even at the maximum density. As an advantage of this feature of Embodiment 5, the operation of the first filter operation section 53 or the filter operation using a filter coefficient supplied by the first coefficient set providing section 57 can be simplified in some cases.

FIG. 25 is an explanatory diagram showing an example of a filter coefficient set with the smooth characteristic. In using the filter coefficient set shown in FIG. 25, the values of the filter coefficients are 1 and 0 alone, and the number of kinds of the coefficient values is small. Therefore, the throughput of the filter operation can be small. When a process result of the operation of the first filter operation section 53 using a filter coefficient set with a strong smooth characteristic as that shown in FIG. 25 or the filter operation using a filter coefficient set as that shown in FIG. 25 supplied by the first coefficient set providing section 57 and a process result of the operation of the second filter operation section 54 or the filter operation using a filter coefficient set supplied by the second coefficient set providing section 58 are mixed, the strong smoothing effect can be weakened so as to attain an appropriate smoothing result.

Embodiment 6

The weighting coefficients (mixing ratios) α and β are calculated on the basis of the local density value calculated with respect to each color of R, G and B in the aforementioned embodiments) which does not limit the invention. Instead, local density values of a plurality of colors of R, G and B area calculated, based on which weighting coefficients α and β to be commonly used for the respective colors may be calculated.

Figure 27:
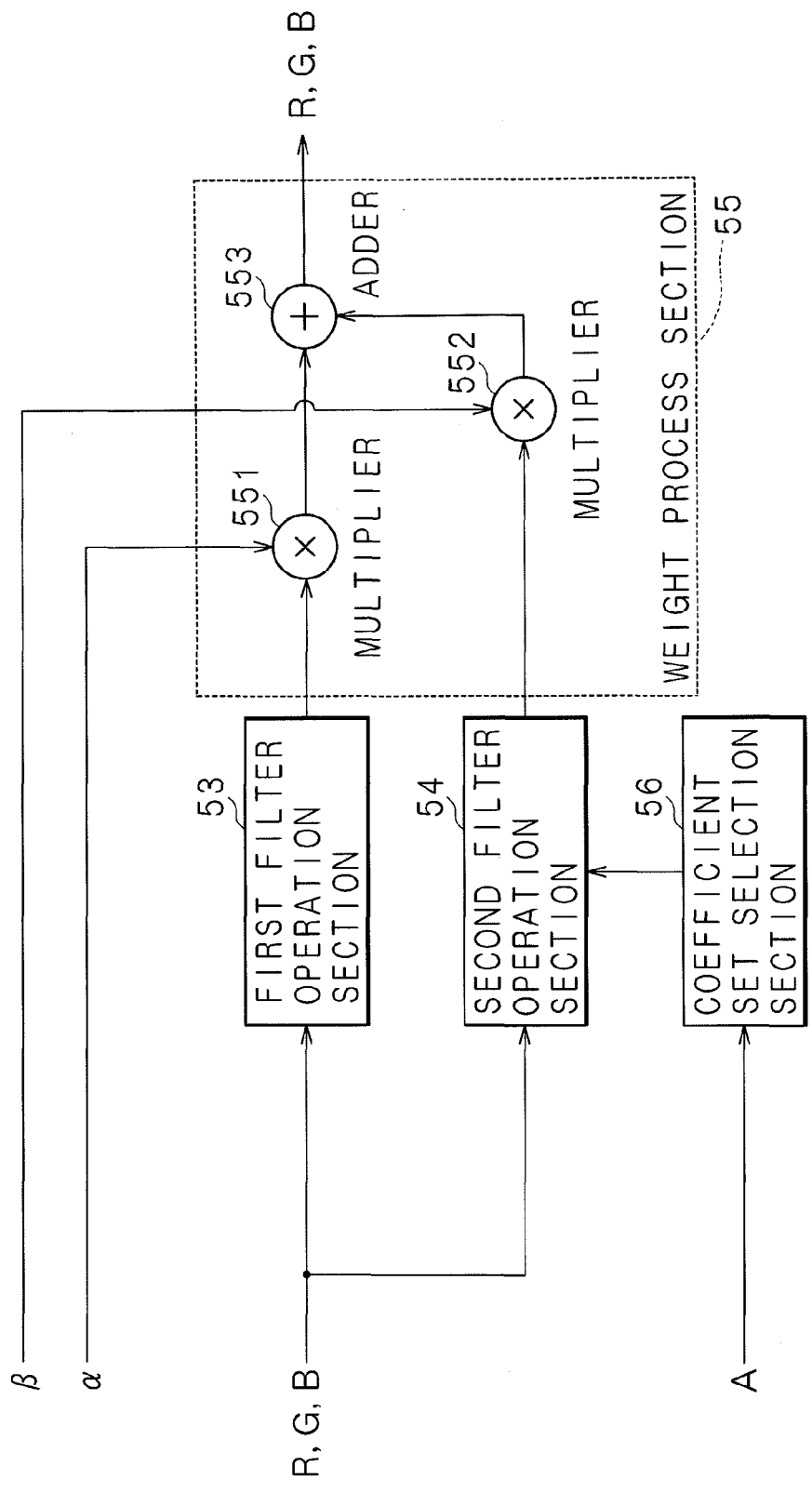
FIG. 27 is a block diagram showing an example of the configuration of each color spatial filter section.

FIG. 26 is a block diagram showing an example of the configuration of a spatial filter process section 50 of Embodiment 6, and FIG. 27 is a block diagram showing an example of the configuration of each of color spatial filter sections 504, 505 and 506 for respective colors. As shown in FIG. 26, the spatial filter process section 50 of Embodiment 6 includes a common local density calculation section 502, a common mixing ratio calculation section 503, the color spatial filter sections 504, 505 and 506 for the respective colors, and the like.

The common local density calculation section 502 executes, on a pixel region of 5×5 pixels as shown in the example of FIG. 6, a convolution operation for each color by using a coefficient set provided with the same weighting coefficient (which is 1 in the example of FIG. 6), and calculates a weighted average value with a weight given to each color, so as to calculate a local density value. For example, in employing three colors of R, G and B, when a weighted average value is obtained with the weights given to the colors of R, G and B set respectively to 0.30, 0.58 and 0.12, a density value not corresponding to the density of each color but corresponding to the quantity of light can be obtained.

The common mixing ratio calculation section 503 calculates, in accordance with the local density value calculated by the common local density calculation section 502 and a segmentation class signal A, weighting coefficients (mixing ratios) α and β commonly used for the respective colors, and outputs the calculated weighting coefficients α and β to the color spatial filter sections 504, 505 and 506 for the respective colors. The color spatial filter section 504 includes a first filter operation section 53, a second filter operation section 54, a coefficient set selection section 56 and a weight process section 55. The first filter operation section 53, the second filter operation section 54, the coefficient set selection section 56 and the weight process section 55 are configured in the same manner as in the example shown in FIG. 15, and hence, the description is omitted. Furthermore, each of the color spatial filter sections 505 and 506 has the same configuration as the color spatial filter section 504.

In this manner, when the weighting coefficients (mixing ratios) α and β are commonly used for the respective colors, the same filter process can be performed for all the colors. Thus, there is no need to perform different filter processes for different colors in color mixture, and a difference in image quality between the color mixture and non-color mixture can be avoided.

Embodiment 7

The first filter operation section 53 and the second filter operation section 54 are provided in parallel for performing the individual operations on the same input image data in the aforementioned embodiments, which does not limit the invention. The first filter operation section 53 and the second filter operation section 54 may be provided in series.

Figure 28:
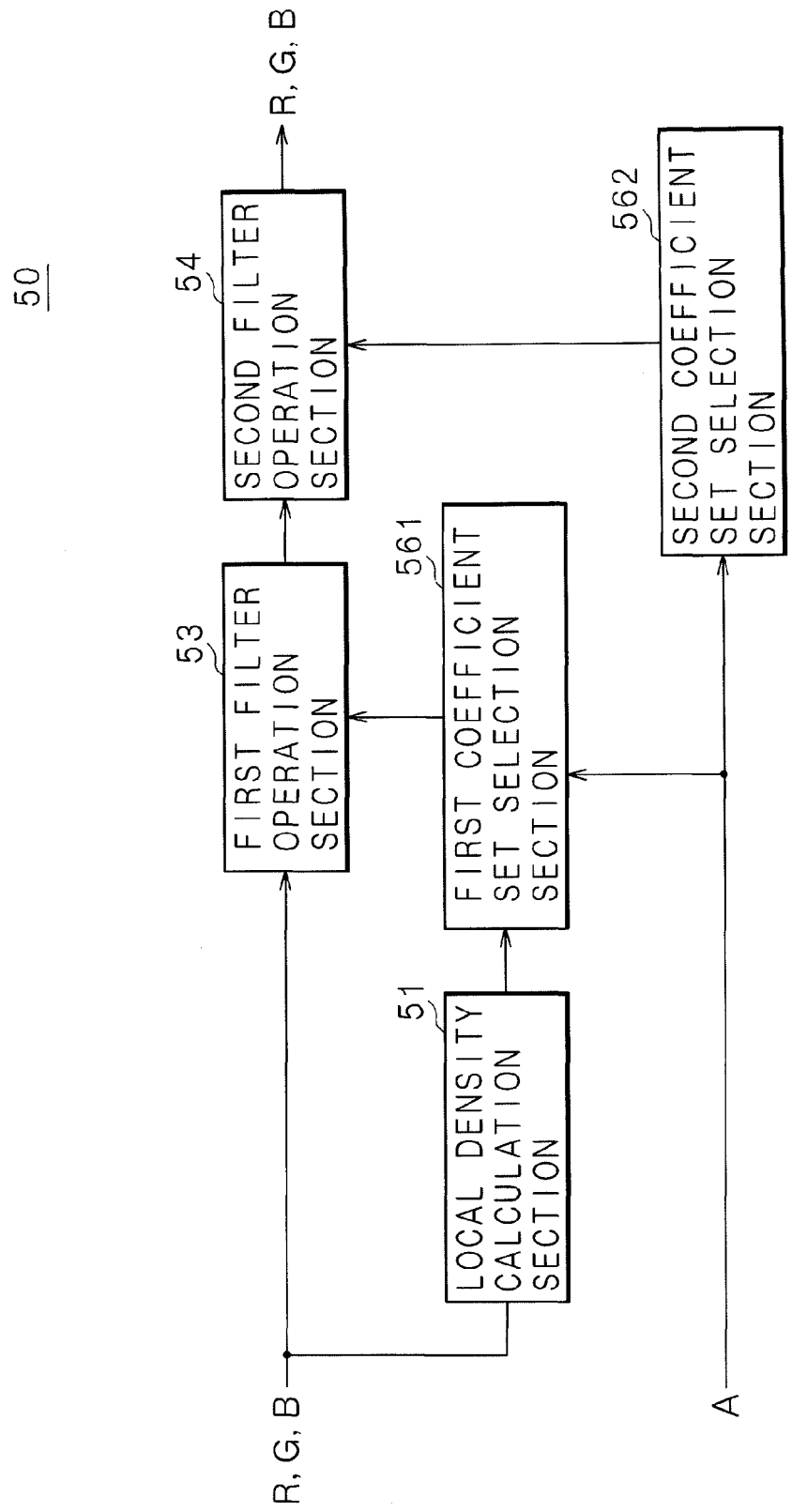
FIG. 28 is a block diagram showing an example of the configuration of a spatial filter process section of Embodiment 7.

FIG. 28 is a block diagram showing an example of the configuration of a spatial filter process section 50 of Embodiment 7. The spatial filter process section 50 of Embodiment 7 includes a local density calculation section 51, a first coefficient set selection section 561, a second coefficient set selection section 562, a first filter operation section 53, a second filter operation section 54 and the like. The first coefficient set selection section 561 precedently stores a plurality of sets of filter coefficients, selects a filter coefficient set in accordance with a local density value calculated by the local density calculation section 51 and a segmentation class signal A, and outputs the selected filter coefficient set to the first filter operation section 53.

Figure 29:
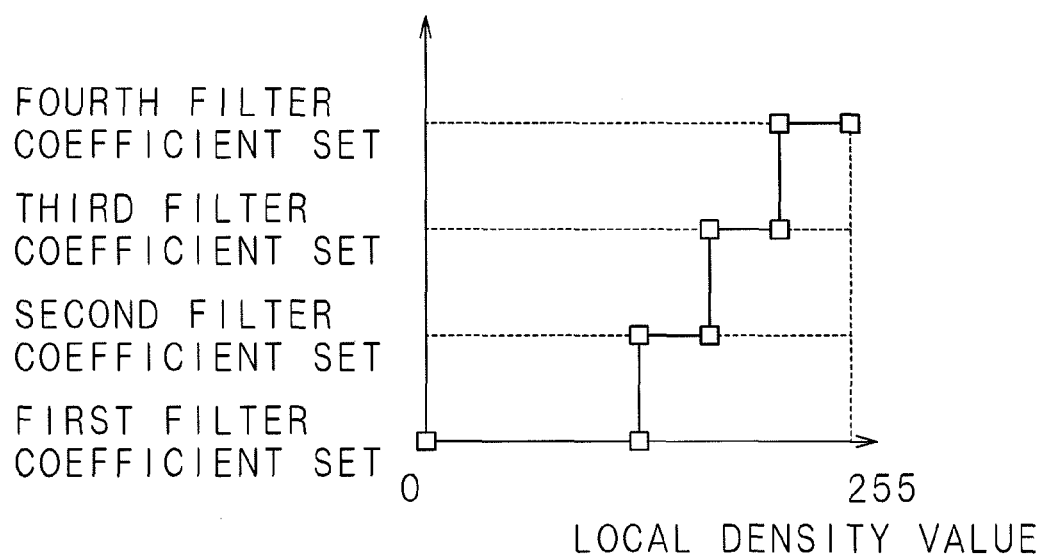
FIG. 29 is an explanatory diagram showing an example of a selecting method for filter coefficients.

FIG. 29 is an explanatory diagram showing an example of the selection of filter coefficient sets, FIG. 30 is an explanatory diagram showing an example of a first filter coefficient set, FIG. 31 is an explanatory diagram showing an example of a second filter coefficient set, and FIG. 32 is an explanatory diagram showing an example of a third filter coefficient set. As shown in FIG. 29, when the segmentation class signal A corresponds to a halftone area or an other area (namely, an area other than a text edge area), the first coefficient set selection section 561 selects, in accordance with the local density value, one of the first filter coefficient set (shown in FIG. 30), the second filter coefficient set (shown in FIG. 31), the third filter coefficient set (shown in FIG. 32) and a fourth filter coefficient set (shown in FIG. 9) respectively different in the smoothing degree of the smooth characteristic. Thus, for example, as the local density value is larger (namely, the density is higher), the smoothing degree is increased. In this manner, noise can be suppressed in a high density region as well as the increase of an average density caused through the filter process due to the noise can be suppressed, resulting in preventing the image quality degradation.

When the segmentation class signal A corresponds to a text edge area, the first coefficient set selection section 561 selects the first filter coefficient set (shown in FIG. 30) regardless of the local density value, so as not to perform the smoothing process. When the segmentation class signal A corresponds to a halftone area or an other area (namely, an area other than a text edge area), the second coefficient set selection section 562 selects a filter coefficient set for performing the filter process with the mixed characteristic as shown in FIG. 10, and when the segmentation class signal A corresponds to a text edge area, it selects a filter coefficient set for performing the filter process with the enhancement characteristic as shown in FIG. 16, and the second coefficient set selection section 562 outputs the selected filter coefficient set to the second filter operation section 54.

The first filter operation section 53 performs the filter operation on input image data by using the filter coefficient set selected by the first coefficient set selection section 561, and outputs the image data resulting from the operation to the second filter operation section 54. The second filter operation section 54 performs the filter operation on the image data outputted from the first filter operation section 53 by using the filter coefficient set selected by the second coefficient set selection section 562.

As described above, the first coefficient set selection section 561 selects one filter coefficient set from a plurality of filter coefficient sets respectively having various smooth characteristics in accordance with a local density value and a segmentation class signal A, and the second coefficient set selection section 562 selects one filter coefficient set from a plurality of filter coefficient sets respectively having various mixed characteristics of the enhancement characteristic and the smooth characteristic in accordance with the segmentation class signal A. Therefore, noise of a predetermined higher frequency is removed in the first filter operation section 53, that is, a former filter process section, and then, an optimum filter process can be performed on a specific pixel region by the second filter operation section 54. It is noted that the first filter operation section 53 and the second filter operation section 54 may be exchanged to change the order of performing their processes.

Figure 33:
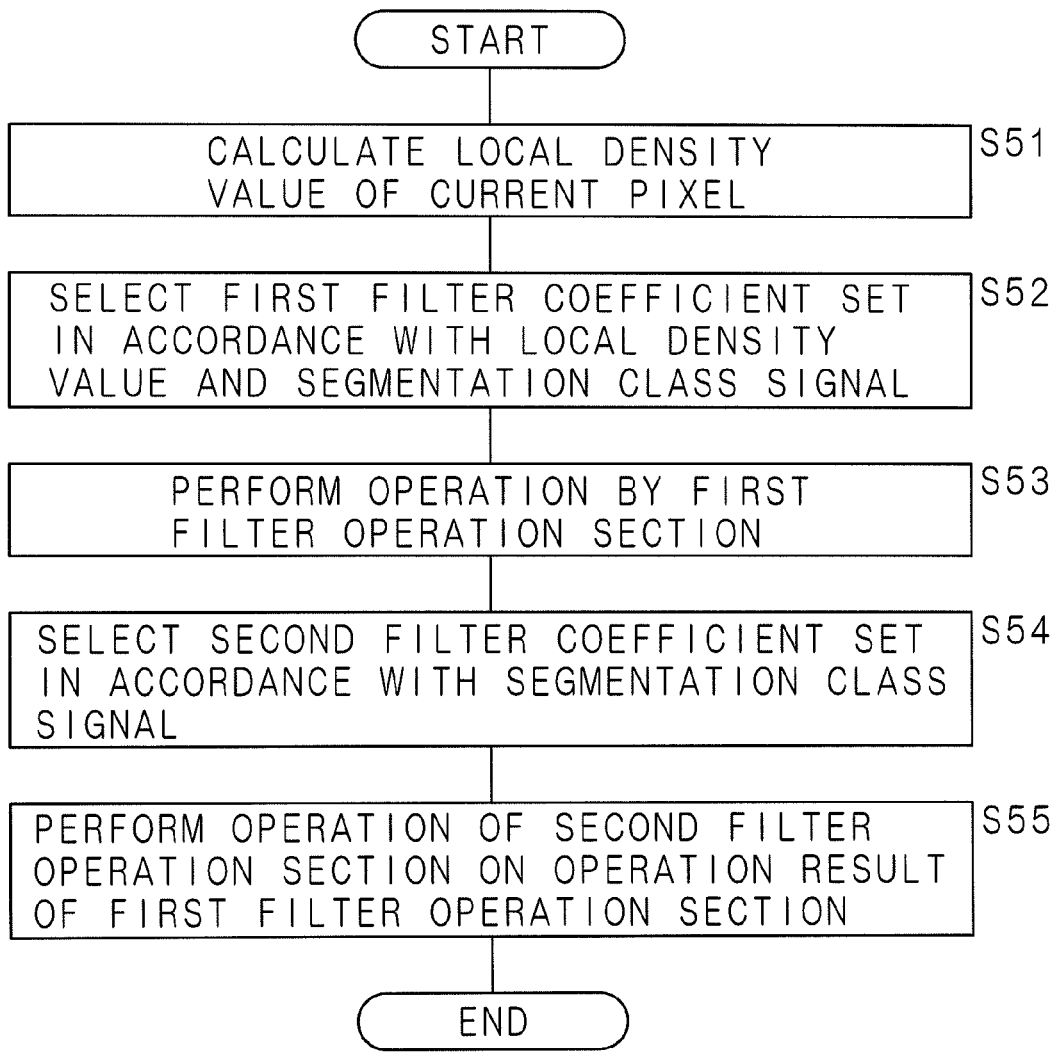
FIG. 33 is a flowchart showing exemplified procedures in a spatial filter process performed by an image process section of Embodiment 7.

The operation of an image process section 100 of Embodiment 7 will now be described. FIG. 33 is a flowchart showing exemplified procedures in a spatial filter process performed by the image process section 100 of Embodiment 7. The spatial filter process section 50 calculates a local density value of a current pixel (S51), and selects a first filter coefficient set in accordance with the local density value and a segmentation class signal (S52). The spatial filter process section 50 performs an operation of the first filter operation section 53 by using the selected filter coefficient set (S53), and outputs an operation result to the second filter operation section 54. The spatial filter process section 50 selects a second filter coefficient set in accordance with the segmentation class signal (S54), performs an operation of the second filter operation section 54 on the operation result of the first filter operation section 53 by using the selected filter coefficient set (S55), and terminates the process.

Embodiment 8

In each of the aforementioned embodiments, each component (each functional block) of the spatial filter process section 50 and a control section (not shown) included in the digital color copying machine (or the multi-function peripheral) can be realized by software by using a processor of a CPU or the like. Specifically, the digital copying machine (or the multi-function peripheral) includes a CPU (central processing unit) executing instructions of a control program for realizing each function, a ROM (read only memory) storing the program, a RAM (random access memory) unwinding the program, a storage device (a memory product) such as a memory storing the program and various data, and the like.

The present invention can be practiced by supplying, to the digital copying machine (or the multi-function peripheral), a memory product that stores, in a computer-readable manner, program codes of a control program (such as an execute form program, an intermediate code program or a source program) for the digital copying machine (or the multi-function peripheral), that is, the software for realizing the aforementioned functions, and by reading and executing the program codes recorded in the memory product by a computer (or a CPU or an MPU).

The memory product may be, for example, a tape type medium such as a magnetic tape or a cassette tape; a magnetic disk type medium such as a flexible disk or a hard disk; a disk type medium such as a CD-ROM, an MO, an MD, a DVD or a CD-R; a card type medium such as an IC card (including a memory card) or an optical card; or a semiconductor memory type medium such as a mask ROM, an EPROM, an EEPROM or a flash ROM.

Furthermore, the digital copying machine (or the multi-function peripheral) may be constructed to be connectable to a communication network, so that the program codes can be supplied through the communication network. The communication network is not particularly specified, and may be any of, for example, Internet, an intranet, an extranet, a LAN, an ISDN, a VAN, a CATV communication network, a virtual private network, a telephone network, a mobile network, a satellite communication network and the like. Furthermore, a transmission medium used in the communication network is not particularly specified, and may be a wired medium such as an IEEE 1394, a USB, a power line carrier, a cable TV circuit, a telephone line or an ADSL; or a wireless medium such as infrared rays like IrDA or a remote controller, Bluetooth (registered trademark), 802.11 radio transmission, HDR, a cellular phone line, a satellite line or a ground wave digital network.

The present invention can be practiced also in the form of a computer data signal buried in a carrier in which the program codes are embodied through electronic transmission. Furthermore, each functional block of the digital copying machine (or the multi-function peripheral) is not limited to one realized by using software but may be one built by a hardware logic, or may be a combination of hardware for executing a part of the processes and operation means for executing software for controlling the hardware and performing the rest of the processes.

The present invention is applicable to an image input device such as a flatbed scanner, a film scanner or a digital camera; a computer capable of executing the aforementioned processes by loading a predetermined program; an image display device for displaying a process result obtained by a computer such as a CRT display or a liquid crystal display; and an image forming apparatus such as a printer for outputting a process result obtained by a computer onto paper or the like. Furthermore, the present invention may be provided with a network card or a modem working as communication means connected to a server or the like through a network.

The filter coefficient set mentioned in each of the embodiments is described merely as an example, and the coefficients are not limited to those described above. A filter coefficient set with different coefficient values or a different size may be appropriately used.

As this invention may be embodied in several forms without departing from the spirit of essential characteristics thereof, the present embodiments are therefore illustrate and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus performing an image process on input image data, comprising:
   a density calculation section which calculates a density of a pixel region including a plurality of pixels of an input image on the basis of a pixel value of the pixel region;
   a first process section which performs a smoothing process on the input image data;
   a second process section which performs a process having both an enhancement characteristic and a smooth characteristic on the input image data;
   a weighting coefficient setting section which sets, in accordance with the density calculated by the density calculation section, a first coefficient used for weighting an image data having been processed by the first process section and a second coefficient used for weighting an image data having been processed by the second process section;
   a weight process section which weights the image data having been processed by the first process section by using the first coefficient set by the weighting coefficient setting section, weights the image data having been processed by the second process section by using the second coefficient set by the weighting coefficient setting section, adds weighted image data to each other and outputs image data resulting from addition; and
   an area image discrimination section which determines, on the basis of a pixel value within a pixel block containing a plurality of pixels including a current pixel, whether or not the input image belongs to a text edge area,
   wherein the weighting coefficient setting section sets the first coefficient and the second coefficient for performing the smoothing process on the input image data when the area image discrimination section determines that the input image does not belong to a text edge area and the density calculated by the density calculation section is larger than a predetermined density threshold value.

2. An image forming apparatus, comprising:
   the image processing section of claim 1; and
   an image output section which forms an image having been processed by the image processing apparatus.

3. An image processing apparatus performing an image process on input image data, comprising:
   a density calculation section which calculates a density of a pixel region including a plurality of pixels of an input image on the basis of a pixel value of the pixel region;
   a first process section which performs a smoothing process on the input image data;
   a second process section which performs a process having both an enhancement characteristic and a smooth characteristic on the input image data;
   a weighting coefficient setting section which sets, in accordance with the density calculated by the density calculation section, a first coefficient used for weighting an image data having been processed by the first process section and a second coefficient used for weighting an image data having been processed by the second process section;
   a weight process section which weights the image data having been processed by the first process section by using the first coefficient set by the weighting coefficient setting section, weights the image data having been processed by the second process section by using the second coefficient set by the weighting coefficient setting section, adds weighted image data to each other and outputs image data resulting from addition; and
   an area image discrimination section which determines, on the basis of a pixel value within a pixel block containing a plurality of pixels including a current pixel, whether or not the input image belongs to a text edge area,
   wherein the weighting coefficient setting section sets the first coefficient and the second coefficient for performing the process of the second process section on the input image data when the area image discrimination section determines that the input image belongs to a text edge area.

4. An image forming apparatus, comprising:
   the image processing section of claim 3; and
   an image output section which forms an image having been processed by the image processing apparatus.

5. An image processing apparatus performing an image process on input image data, comprising:
   a density calculation section which calculates a density of a pixel region including a plurality of pixels of an input image on the basis of a pixel value of the pixel region;
   a first process section which performs a smoothing process on the input image data;
   a second process section which performs a process having both an enhancement characteristic and a smooth characteristic on the input image data;
   a weighting coefficient setting section which sets, in accordance with the density calculated by the density calculation section, a first coefficient used for weighting an image data having been processed by the first process section and a second coefficient used for weighting an image data having been processed by the second process section; and
   a weight process section which weights the image data having been processed by the first process section by using the first coefficient set by the weighting coefficient setting section, weights the image data having been processed by the second process section by using the second coefficient set by the weighting coefficient setting section, adds weighted image data to each other and outputs image data resulting from addition,
   wherein the density calculation section calculates the density on the basis of the pixel value of the pixel region of each of a plurality of specific colors, and
   the weighting coefficient setting section sets the first coefficient and the second coefficient for performing an identical weight process with respect to the respective specific colors in accordance with the density calculated by the density calculation section.

6. An image forming apparatus, comprising:
   the image processing section of claim 5; and
   an image output section which forms an image having been processed by the image processing apparatus.

7. An image processing apparatus performing a digital filter operation process on input image data, comprising:
- a first storage section which stores a first filter coefficient used for performing a smoothing process on the input image data;
- a second storage section which stores a second filter coefficient used for performing a process different from the smoothing process on the input image data;
- a density calculation section which calculates a density of a pixel region including a plurality of pixels of an input image on the basis of a pixel value of the pixel region;
- a weighting coefficient setting section which sets, in accordance with the density calculated by the density calculation section, a first coefficient used for weighting the first filter coefficient and a second coefficient used for weighting the second filter coefficient;
- an operation section which performs a filter operation on the input image data by using at least the first filter coefficient or the second filter coefficient; and
- a weight process section which weights the first filter coefficient by using the first coefficient set by the weighting coefficient setting section, weights the second filter coefficient by using the second coefficient set by the weighting coefficient setting section, obtains a new filter coefficient by adding weighted filter coefficients to each other and outputs the new filter coefficient to the operation section; and
- an area image discrimination section which determines, on the basis of a pixel value within a pixel block containing a plurality of pixels including a current pixel, whether or not the input image belongs to a text edge area,
- wherein the weighting coefficient setting section sets the first coefficient and the second coefficient for performing the filter operation on the input image by the operation section by using the first filter coefficient when the area image discrimination section determines that the input image does not belong to a text edge area and the density calculated by the density calculation section is larger than a predetermined density threshold value.

8. An image forming apparatus, comprising:
the image processing apparatus of claim 7; and
an image output apparatus which forms an image having been processed by the image processing apparatus.

9. An image processing apparatus performing a digital filter operation process on input image data, comprising:
- a first storage section which stores a first filter coefficient used for performing a smoothing process on the input image data;
- a second storage section which stores a second filter coefficient used for performing a process different from the smoothing process on the input image data;
- a density calculation section which calculates a density of a pixel region including a plurality of pixels of an input image on the basis of a pixel value of the pixel region;
- a weighting coefficient setting section which sets, in accordance with the density calculated by the density calculation section, a first coefficient used for weighting the first filter coefficient and a second coefficient used for weighting the second filter coefficient;
- an operation section which performs a filter operation on the input image data by using at least the first filter coefficient or the second filter coefficient; and
- a weight process section which weights the first filter coefficient by using the first coefficient set by the weighting coefficient setting section, weights the second filter coefficient by using the second coefficient set by the weighting coefficient setting section, obtains a new filter coefficient by adding weighted filter coefficients to each other and outputs the new filter coefficient to the operation section; and
- an area image discrimination section which determines, on the basis of a pixel value within a pixel block containing a plurality of pixels including a current pixel, whether or not the input image belongs to a text edge area,
- wherein the weighting coefficient setting section sets the first coefficient and the second coefficient for performing the filter operation on the input image by the operation section by using the second filter coefficient when the area image discrimination section determines that the input image belongs to a text edge area.

10. An image forming apparatus, comprising:
the image processing apparatus of claim 9; and
an image output apparatus which forms an image having been processed by the image processing apparatus.

11. An image processing apparatus performing a digital filter operation process on input image data, comprising:
- a first storage section which stores a first filter coefficient used for performing a smoothing process on the input image data;
- a second storage section which stores a second filter coefficient used for performing a process different from the smoothing process on the input image data;
- a density calculation section which calculates a density of a pixel region including a plurality of pixels of an input image on the basis of a pixel value of the pixel region;
- a weighting coefficient setting section which sets, in accordance with the density calculated by the density calculation section, a first coefficient used for weighting the first filter coefficient and a second coefficient used for weighting the second filter coefficient;
- an operation section which performs a filter operation on the input image data by using at least the first filter coefficient or the second filter coefficient; and
- a weight process section which weights the first filter coefficient by using the first coefficient set by the weighting coefficient setting section, weights the second filter coefficient by using the second coefficient set by the weighting coefficient setting section, obtains a new filter coefficient by adding weighted filter coefficients to each other and outputs the new filter coefficient to the operation section; and
- wherein the density calculation section calculates the density on the basis of the pixel value of the pixel region of each of a plurality of specific colors, and
- the weighting coefficient setting section sets the first coefficient and the second coefficient for performing an identical weight process with respect to the respective specific colors in accordance with the density calculated by the density calculation section.

12. An image forming apparatus, comprising:
the image processing apparatus of claim 11; and
an image output apparatus which forms an image having been processed by the image processing apparatus.

13. A non-transitory computer-readable memory product storing a computer program for causing a computer to perform an image process on input image data, wherein the computer program comprises the steps of:
- causing the computer to calculate a density of a pixel region including a plurality of pixels of an input image on the basis of a pixel value of the pixel region;
- causing the computer to perform a smoothing process on the input image data and perform a process having both an enhancement characteristic and a smooth characteristic on the input image data;

causing the computer to set, in accordance with the calculated density, a first coefficient used for weighting image data having been subjected to the smoothing process and a second coefficient used for weighting image data having been subjected to the process having both an enhancement characteristic and a smooth characteristic;

causing the computer to weight the image data having been subjected to the smoothing process by using the first coefficient, weight the image data having been subjected to the process having both an enhancement characteristic and a smooth characteristic by using the second coefficient, add weighted image data to each other and output image data resulting from addition; and causing the computer to determine, on the basis of a pixel value within a pixel block containing a plurality of pixels including a current pixel, whether or not the input image belongs to a text edge area, wherein the first coefficient and the second coefficient are set for performing the smoothing process on the input image data responsive to a determination that the input image does not belong to a text edge area and the density calculated is larger than a predetermined density threshold value.

14. A non-transitory computer-readable memory product storing a computer program for causing a computer to perform an image process on input image data, wherein the computer program comprises the steps of:

causing the computer to calculate a density of a pixel region including a plurality of pixels of an input image on the basis of a pixel value of the pixel region;

causing the computer to perform a smoothing process on the input image data and perform a process having both an enhancement characteristic and a smooth characteristic on the input image data;

causing the computer to set, in accordance with the calculated density, a first coefficient used for weighting image data having been subjected to the smoothing process and a second coefficient used for weighting image data having been subjected to the process having both an enhancement characteristic and a smooth characteristic;

causing the computer to weight the image data having been subjected to the smoothing process by using the first coefficient, weight the image data having been subjected to the process having both an enhancement characteristic and a smooth characteristic by using the second coefficient, add weighted image data to each other and output image data resulting from addition; and causing the computer to determine, on the basis of a pixel value within a pixel block containing a plurality of pixels including a current pixel, whether or not the input image belongs to a text edge area, the first coefficient and the second coefficient for performing the enhancement characteristic and a smooth characteristic process on the input image data are set responsive to a determination that the input image belongs to a text edge area.

15. A non-transitory computer-readable memory product storing a computer program for causing a computer to perform an image process on input image data, wherein the computer program comprises the steps of:

causing the computer to calculate a density of a pixel region including a plurality of pixels of an input image on the basis of a pixel value of the pixel region, wherein the density is calculated on the basis of the pixel value of the pixel region of each of a plurality of specific colors;

causing the computer to perform a smoothing process on the input image data and perform a process having both an enhancement characteristic and a smooth characteristic on the input image data;

causing the computer to set, in accordance with the calculated density, a first coefficient used for weighting image data having been subjected to the smoothing process and a second coefficient used for weighting image data having been subjected to the process having both an enhancement characteristic and a smooth characteristic; and causing the computer to weight the image data having been subjected to the smoothing process by using the first coefficient, weight the image data having been subjected to the process having both an enhancement characteristic and a smooth characteristic by using the second coefficient, add weighted image data to each other and output image data resulting from addition;

wherein the first coefficient and the second coefficient for performing an identical weight process with respect to the respective specific colors are set in accordance with the density calculated.

* * * * *